US011733528B2

(12) United States Patent
Moore et al.

(10) Patent No.: US 11,733,528 B2
(45) Date of Patent: Aug. 22, 2023

(54) RUGGED INTEGRATED HELMET VISION SYSTEM

(71) Applicant: Galvion Ltd., Portsmouth, NH (US)

(72) Inventors: Christopher Moore, Rye, NH (US); Ed Hall, Starksboro, VT (US); Mathew Reichl, Portsmouth, NH (US); Pascal Tremblay, Montreal (CA)

(73) Assignee: GALVION LTD., Portsmouth, NH (US)

( * ) Notice: Subject to any disclaimer, the term of this patent is extended or adjusted under 35 U.S.C. 154(b) by 162 days.

(21) Appl. No.: 17/168,509

(22) Filed: Feb. 5, 2021

(65) Prior Publication Data

US 2021/0247618 A1 Aug. 12, 2021

Related U.S. Application Data

(60) Provisional application No. 62/971,010, filed on Feb. 6, 2020.

(51) Int. Cl.
*G02B 27/01* (2006.01)
*A42B 3/04* (2006.01)

(52) U.S. Cl.
CPC ..... *G02B 27/0176* (2013.01); *G02B 27/0172* (2013.01); *G02B 27/0179* (2013.01); *A42B 3/042* (2013.01); *G02B 2027/0181* (2013.01)

(58) Field of Classification Search
CPC ........ G02B 27/0176; G02B 2027/0181; G02B 27/0172; G02B 27/0179
See application file for complete search history.

(56) References Cited

U.S. PATENT DOCUMENTS

| 2,814,043 A | 11/1957 | Alesi |
| 3,154,788 A | 11/1964 | Simpson |

(Continued)

FOREIGN PATENT DOCUMENTS

| DE | 630473 C | 5/1936 |
| DE | 8138228 U1 | 6/1983 |

(Continued)

OTHER PUBLICATIONS

International Search Report and Written Opinion issued in corresponding international patent application No. PCT/US2021/016807, dated Dec. 28, 2021.

(Continued)

*Primary Examiner* — Kwang-Su Yang
(74) *Attorney, Agent, or Firm* — George N. Chaclas; Anthony A. Kassas; Day Pitney LLP

(57) ABSTRACT

A rugged integrated helmet vision system is disclosed. The system includes an accessory connector for connecting an accessory such as a heads-up display (HUD) device to a helmet worn by a user. The accessory connector includes a connector arm assembly with a portion that attaches the connector to the helmet, and another portion that attaches the accessory to the connector. The portions each provide multiple degrees of freedom of movement to allow adjustment of the connector with respect to the helmet, and adjustment of the accessory with respect to an eye of the user. The connector also provides the ability to lock positions of and the degrees of freedom of movement of the connector arm assembly via a single locking actuator with one-handed operation. In embodiments, a control box computer system at the helmet communicates with various soldier-portable networks to send and receive information for display by a HUD device accessory.

35 Claims, 17 Drawing Sheets

(56) References Cited

U.S. PATENT DOCUMENTS

| | | |
|---|---|---|
| 3,383,705 A | 5/1968 | Raschke |
| 3,758,889 A | 9/1973 | Erb |
| 4,263,679 A | 4/1981 | Erlendson |
| 4,888,831 A | 12/1989 | Oleson |
| 4,942,628 A | 7/1990 | Freund |
| 5,042,093 A | 8/1991 | Legendre |
| 5,315,718 A | 5/1994 | Barson et al. |
| 5,551,094 A | 9/1996 | Navone |
| 5,572,749 A | 11/1996 | Ogden |
| 5,581,819 A | 12/1996 | Garneau |
| 5,794,272 A | 8/1998 | Workman et al. |
| 5,898,949 A | 5/1999 | Barthold et al. |
| 6,032,297 A | 3/2000 | Barthold et al. |
| 6,081,931 A | 7/2000 | Burns et al. |
| 6,292,952 B1 | 9/2001 | Watters et al. |
| 6,968,575 B2 | 11/2005 | Durocher |
| 7,124,449 B2 | 10/2006 | Sutter et al. |
| 7,178,175 B2 | 2/2007 | Rogers et al. |
| 7,770,239 B1 | 8/2010 | Goldman et al. |
| 8,353,066 B2 | 1/2013 | Rogers et al. |
| 8,739,318 B2 | 6/2014 | Durocher |
| 2005/0217006 A1 | 10/2005 | Sutter et al. |
| 2006/0101560 A1 | 5/2006 | Ketterer et al. |
| 2009/0222978 A1 | 9/2009 | Kenneth |
| 2010/0229286 A1 | 9/2010 | Ahlgren et al. |
| 2011/0094018 A1 | 4/2011 | Rogers et al. |
| 2011/0277222 A1 | 11/2011 | Garneau et al. |
| 2012/0002046 A1* | 1/2012 | Rapoport ........... G02B 27/0176 348/E7.091 |
| 2012/0144565 A1 | 6/2012 | Huh |
| 2012/0144567 A1 | 6/2012 | Huh |
| 2012/0167281 A1 | 7/2012 | Gennrich et al. |
| 2012/0174294 A1 | 7/2012 | Sackett |
| 2013/0000016 A1 | 1/2013 | Hall et al. |
| 2013/0239303 A1 | 9/2013 | Cotterman et al. |
| 2014/0130241 A1* | 5/2014 | Abdollahi .......... G02B 27/0176 2/422 |
| 2014/0240834 A1* | 8/2014 | Mason ............... G02B 27/0081 385/37 |
| 2016/0295948 A1 | 10/2016 | Dowd et al. |
| 2017/0269460 A1 | 9/2017 | Fagerkvist |
| 2018/0308397 A1* | 10/2018 | Sugimoto ............ G02B 27/017 |
| 2020/0019236 A1* | 1/2020 | Parkinson ............... G06F 3/012 |

FOREIGN PATENT DOCUMENTS

| | | |
|---|---|---|
| GB | 1114214 A | 5/1968 |
| WO | 2016/016445 A3 | 2/2016 |
| WO | 2018/173313 A1 | 9/2018 |

OTHER PUBLICATIONS

International Search Report and Written Opinion issued in International Patent Application No. PCT/IB2013/003041, dated Feb. 9, 2015, 12 pages.

International Preliminary Report on Patentability issued in International Patent Application No. PCT/US2021/016807, dated Jul. 28, 2022, 8 pages.

* cited by examiner

RUGGED INTEGRATED HELMET VISION SYSTEM

BACKGROUND OF THE INVENTION

Field of the Invention

The present disclosure relates to adjustable connectors for a helmet-mounted accessory and to heads-up display systems.

Background

The degrees of freedom of a rigid body refers to the number of independent movements it has, minus any constraints upon movement placed upon the body. For example, a rigid body in three-dimensional space without any restrictions on its movement has six degrees of freedom. Three of the degrees of freedom are translational and allow movement of the body along x, y and z axes, in Cartesian coordinates, while the other three are rotational around each of the axes.

A computing device includes at least one or more central processing units (CPUs) and a memory. The CPUs have internal logic circuits that perform arithmetic operations and execute machine code instructions of applications ("application code") loaded into the memory. The instructions control and communicate with input and output devices (I/O) such as displays, printers and network interfaces.

The CPUs of the computing devices are typically configured as either microprocessors or microcontrollers. A microprocessor generally includes only the CPU in a physical fabricated package, or "chip." Computer designers connect the CPUs to external memory and I/O to make the microprocessors operational. Microcontrollers, in contrast, integrate the memory and the I/O within the same chip that houses the CPU.

The CPUs of the microcontrollers and microprocessors execute application code that extends the capabilities of the computing devices. In the microcontrollers, the application code is typically pre-loaded into the memory before startup and cannot be changed or replaced during run-time. In contrast, the CPUs of the microprocessors are typically configured to work with an operating system that enables different applications to execute at different times during run-time.

The operating system has different functions. The operating system enables application code of different applications to be loaded and executed at run-time. Specifically, the operating system can load the application code of different applications within the memory for execution by the CPU, and schedule the execution of the application code by the CPU. For this reason, the operating system is said to execute "on top of" the CPU.

Heads-up display (HUD) devices are computing devices that include display screens. The display screens display information to individuals and are positioned within fields of view of the individuals. In one example, the HUD devices are mounted to helmets worn by the individuals. The individuals wearing the HUD devices are also known as users of the HUD devices. Video images to be displayed onto a display screen are generated by or received from a data processing device. The images are typically arranged into image frames wherein each image frame is a separate image displayed on the display screen. The images are refreshed at a refresh rate e.g. measured in frames per second. Each image frame includes a plurality of image pixels e.g. a raster image representation having an image resolution. The image resolution can be expressed as a linear resolution, e.g. pixels per millimeter, an area resolution, e.g. pixel per square millimeter, or as a total number of horizontal and vertical pixels.

Data associated with rendering each pixel may include a pixel brightness value, e.g. two values, on or off, for black and white images, or a plurality of values, e.g. ranging between on and off, for grey scale image rendering. Data associated with rendering each pixel may also include a color value or a combination of color values, e.g. representing a Red, Green, Blue (RGB) color space. It is known to mount a HUD device to a helmet or other head gear worn by a user. It is known to provide a helmet-mounted accessory connector between the helmet and a HUD device to mechanically attach the HUD device to the helmet and to adjust the position of the HUD display screen to position the HUD display screen to a desired operating position in the field of view of the user.

Helmet-mounted HUD transparent display screen devices are used to display information in the field of view of a user while still allowing the user to look through the HUD transparent display screen to view objects in the field of view beyond the transparent display screen. However, the user may elect not to use the HUD transparent display screen in all situations, especially when the displayed information is not needed. However, conventional mechanical helmet-mounted accessory connectors lack a convenient and user friendly attaching arrangement for quickly and easily moving the HUD out of the field of view of the user when the HUD device is not in use and then quickly and easily moving the HUD back into the field of view when the displayed information is needed.

In practice, moving or removing a HUD between an operating position and a non-operating position is difficult because the operating location and orientation of the HUD device is limited to a very small region associated with comfortable viewing by the user and preferably the user should choose the operating position. Moreover, there can be instances when a user needs to install the HUD display screen into the operating position or remove the HUD display screen from the operating position while the user is preoccupied e.g. while driving or piloting a vehicle, vessel or aircraft, while carrying other equipment, e.g. a weapon, radio, medical kit, tool kit, or the like, or while working in various emergency situations e.g. in a battle, a fire zone, a medical emergency, a public safety emergency, a police emergency, and the like.

The HUD display device includes a computer interface between the HUD display device and an image source, e.g. a CPU or other data processing device or a network interface device and the computer interface can include a wired connection that limits movement of the HUD device with respect to the wire attachment point. While the wire can be detached from the HUD device, it is preferable for the HUD device to remain attached to the wire interface so that is can be easily located for rapid reattachment to the helmet-mounted accessory connector.

SUMMARY

Existing helmet-mounted HUD devices have problems. Each HUD device typically requires precise positioning and alignment of its display screen relative to the user's eye/field of view, but this is often difficult to achieve. In addition, once the HUD device is properly positioned and aligned, the position of the HUD device may require frequent readjustment over time. This can occur when the user removes the HUD when not in use and then replaces the HUD device when needed, or when the position of the HUD device is inadvertently altered when used in physically demanding applications such as, for example, in training of soldiers or in the battlefield, working in dangerous environments, and or piloting vehicles, vessels, or aircraft.

Precise positioning and alignment of the display screens of existing HUD devices is often difficult to achieve. This is because the positioning elements of the connectors are limited in number and are limited in their degrees of freedom of movement. As a result, the user performs a series of trial-and-error adjustments of the connector, often with two hands. This is a significant disadvantage when there is a need to reconnect the HUD devices to helmets worn by soldiers in training and in battlefield situations, for example.

Users also readjust the connector to position and align the existing HUD devices after replacing the HUD devices. In one example, the HUD devices are often secured to the connectors with screws or other fastening means that do not allow the user to easily remove and reattach the HUD device from the connector. As a result, removal and replacement of HUD devices often requires the user to repeat the process of positioning and aligning the HUD device.

In general, according to one aspect, an accessory connector comprises a connector arm assembly and a helmet attachment clip. The connector arm assembly includes an upper body portion and a lower body portion, where each of the body portions include a base and an arm extension that extends from each base. The upper and lower body portions are rotatably joined at their bases and are aligned relative to a base alignment axis that passes through a center of each of the bases. Typically, the upper and lower body portions are independently rotatable about a common base axis Each of the body portions also include a ball joint rotatably attached to a distal end of each of the arm extensions, and an end rod extending from the ball of each of the ball joints. The helmet attachment clip is connected to a distal end of the end rod of the upper body portion by an attachment sleeve. The clip preferably attaches the connector to a helmet worn by a user.

In one implementation, the upper and lower body portions are joined at their bases by a hinge joint used to lock the bases together in a desired orientation and to prevent movement of either of the bases.

The accessory connector also includes an accessory attachment bar for attaching an accessory to the connector. The accessory attachment bar attaches to a distal end of the end rod of the lower body portion. Preferably, the connector allows one-handed adjustment of the accessory position by a user and one-handed adjustment of the locking and unlocking of the accessory by the user. The accessory attachment bar permits removable attachment of the accessory. In one example, the accessory is a heads-up display (HUD) device.

The accessory connector enables adjustment of the HUD device accessory by the user to place a display screen of the HUD device accessory in a desired position and angular orientation relative to an eye of the user, e.g. an operating position, such that image frames displayed on the display screen are discernable by the user.

In one implementation, the attachment bar includes one or more first magnets and the accessory includes one or more second magnets. In this way, the accessory attaches to the accessory attachment bar via magnetic coupling between the one or more first magnets and the one or more second magnets. Preferably, the accessory attachment bar includes one or more first magnets coupled thereto and the accessory includes one or more second magnets coupled thereto, where the accessory is coupled to the accessory attachment bar via magnetic coupling between the one or more first magnets and the one or more second magnets.

Typically, the accessory attachment bar includes one or more first alignment features and the accessory includes one or more second alignment features. The one or more first alignment features are configured to be in mating contact with the one or more second alignment features and none of the first or the second alignment features are adjustable by the user. Typically, the one or more first and second alignment features are configured to repeatedly couple the accessory with the accessory attachment bar in the same spatial orientation. The helmet attachment clip fixedly attaches the accessory connector to a helmet worn by the user.

Preferably, the extensions of the upper and lower body portions each extend from their respective bases along arm extension axes that are each substantially perpendicular to the base alignment axis.

The ball joint of the upper body portion and the ball joint of the lower body portion are each rotatably attached to distal ends of their respective arm extensions to provide 360 degrees of rotation of the ball joints about their respective arm extension axes.

In one implementation, the ball joint of the upper body portion and the ball joint of the lower body portion each include: a collar, formed by an annular wall enclosing a ball chamber and forming a proximal aperture and a distal aperture, and a ball supported inside the ball chamber. Each end rod is fixedly attached to its respective ball with the end rod distal end extending from the distal aperture, where the collar, the ball and the end rod of each ball joint is rotatable about the arm extension axis.

In another implementation, the ball joint of the upper body portion and the ball joint of the lower body portion each include a first collar retaining clip engaged with a distal end of each arm extension and a second collar retaining clip engaged with an inside surface of a distal end of each ball chamber annular wall. Here, the first collar retaining clip of each ball joint prevents each collar from separating from the distal end of each upper arm extension and the second collar retaining clip of each ball joint prevents each ball from exiting from the ball chamber through the distal aperture.

In yet another implementation, each of the collars is formed with a collar cutout penetrating the annular wall and the distal aperture for receiving a perimeter of each end rod therein. Each cutout receives the perimeter of each end rod when the ball and end rod are rotated with respect to the collar to engage the perimeter of the end rod at least partially within the cutout.

The connector arm assembly also includes a locking mechanism for placing the connector in a locked configuration. The locking mechanism locks the bases to prevent rotation of the upper and lower body portions relative to one another around the base alignment axis. The locking mechanism also locks the upper body portion to fix rotations of its ball joint with respect to its upper arm extension and to fix rotations of its end rod with respect to its ball joint. Furthermore, the locking mechanism locks the lower body portion to fix rotations of its ball joint with respect to its lower arm extension and to fix rotations of its end rod with respect to its lower ball joint.

The locking mechanism also includes a hinge joint disposed between the bases that includes a locking interface. The locking interface prevents rotation of the bases relative to one other around the base alignment axis when the accessory connector is in the locking configuration. In one implementation, the locking interface is a friction gasket. In another implementation, the locking interface includes upper locking teeth disposed on a lower face of the base of the upper body portion, and lower locking teeth disposed on an upper face of the base of the lower body portion. The lower locking teeth engage with the upper locking teeth.

In general, according to another aspect, a connector arm assembly includes an upper body portion, an upper ball joint and a lower body portion. The upper body portion includes an upper base that extends along a base axis and an upper arm extension that extends from the upper base along an upper arm extension axis. The upper ball joint is connected to a distal end of the upper arm extension and includes an upper end rod and an upper ball connected to the upper end rod.

Preferably, the upper ball is rotatably seated within the upper collar, and the upper collar includes an annular wall, an enclosing upper ball chamber (1246), a proximal aperture (1248) and a distal aperture (1250). The upper end rod extends from the upper collar through the distal aperture. Preferably, each of the upper collar, the upper ball and the upper end rod rotates about the upper arm extension axis relative to the upper arm extension.

The lower body portion includes a lower base that extends along the base axis and a lower arm extension that extends from the lower base along a lower arm extension axis. The upper base and the lower base are independently rotatable about the base axis.

In the connector arm assembly, each of the upper arm extension axis and the lower arm extension axis is substantially perpendicular with the base axis.

Preferably, the upper base is rotatably connected to the lower base via a hinge joint formed between the upper base and the lower base. The bases can rotate around and are aligned along a base alignment axis that passes through a center of each of the bases.

In a preferred embodiment, the upper collar includes a cutout that allows the upper ball and thus the upper end rod connected to the upper ball to rotate relative to the upper ball joint in a range of motion that spans from a seated position within the cutout, to an unseated position that is at least substantially parallel and coincident to the upper arm extension axis. When the connector arm assembly is in a slightly unlocked configuration, the upper ball can be frictionally seated within the upper collar to enable persistent positioning of the upper end rod after movement of the upper end rod by a user while the user is making fine adjustments of the position of the accessory attachment bar. In this instance, persistent positioning advantageously allows a user to make fine adjustments to the spatial position and orientation of the accessory attached to the attachment bar. Persistent positioning allows the user to place the accessory in a desired location or orientation using one hand and then let go of the accessory while the accessory remains in the desired location without fully locking the accessory connector. In an example, the user can make a plurality of fine adjustments to the position and orientation of the accessory using one hand to overcome the frictional seating before fully locking the accessory connector using the lock actuator.

In one example, the upper collar includes a collar cutout penetrating the annular wall and the distal aperture for receiving a perimeter of the end rod therein, when the ball and the end rod are rotated with respect to the collar to engage the perimeter of the end rod at least partially within the cutout. Moreover, when the connector arm assembly is in an unlocked configuration, the upper ball can be frictionally seated within the upper collar to enable persistent positioning of the upper end rod after movement of the upper end rod.

Typically, each of the upper collar, the upper ball and the upper end rod rotates 360 degrees around the upper end rod axis relative to the upper arm extension. Preferably, a distal end of the upper end rod connects to a helmet attachment clip that enables attachment of the connector arm assembly to a helmet worn by a user.

The lower body portion also includes a lower collar connected to a distal end of the lower arm extension, and a lower end rod and a lower ball connected to the lower end rod. The lower ball is seated within the lower collar to form a lower ball joint. The lower end rod rotates relative to the lower collar, and the lower collar, the lower ball and the lower end rod attached to the lower ball rotate 360 degrees around a lower arm extension axis that runs substantially longitudinal to a length of the lower arm extension.

The connector arm assembly can also include a lower ball joint connected to a distal end of the lower arm extension. For this purpose, the lower ball joint includes a lower end rod and a lower ball connected to the lower end rod, where the lower collar includes an annular wall enclosing a lower ball chamber and a proximal aperture and a distal aperture formed by the annual wall. Typically, the lower ball is seated within the lower ball chamber and the lower end rod extends from the lower collar through the distal aperture. Here, each of the lower collar, the lower ball and the lower end rod rotates with respect to the lower arm extension with rotation about the lower arm extension axis.

The connector arm assembly also includes a threaded rod and a locking actuator. The threaded rod is disposed within an upper cavity formed by the upper base and within a lower cavity formed by the lower base. The locking actuator engages with the threaded rod. The locking actuator can rotate in a locking direction to transition the connector arm assembly to a locked configuration that prevents movement of the upper base with respect to the lower base and locks the upper ball joint and the lower ball joint in fixed positions and degrees of rotation.

In one implementation, the connector arm assembly is attached to a front portion of a helmet worn by the user. The user can manipulate the locking actuator using one hand to transition the connector arm assembly into the locked configuration and to transition the connector arm assembly into an unlocked configuration. Additionally, the user can manipulate the locking actuator using one hand to achieve a slightly locked state to enable persistent positioning of the lower upper rod after movement of the lower end rod by a user while adjusting a position or orientation of the accessory attached to the accessory attachment bar. The persistent positioning provided by the slightly locked state can be overcome but the user to make fine adjustments to the position or orientation of the accessory attached to the accessory attachment bar.

In a preferred embodiment, the lower collar includes a collar cutout penetrating the annular wall and the distal aperture for receiving a perimeter of the lower end rod therein. When the collar cutout receives the perimeter of the lower end rod, the lower ball and the lower end are rotated with respect to the lower collar to engage the perimeter of the lower rod at least partially within the cutout.

Preferably, each of the lower collar, the lower ball and the lower end rod rotate with respect to the lower arm extension with a range of motion that is 360 degrees around the lower arm extension axis.

When the connector arm assembly is in an unlocked configuration, the lower ball can be frictionally seated within the lower collar to enable persistent positioning of the lower end rod after movement of the lower end rod. Typically, a distal end of the lower end rod connects to an accessory attachment bar. As noted, the persistent positioning provided by the slightly locked state can be overcome but the user to make fine adjustments to the position or orientation of the accessory attached to the accessory attachment bar.

The connector arm assembly also includes an upper lock wedge disposed within an upper cavity of the upper base and a lower lock wedge disposed within a lower cavity of the lower base. The upper and lower lock wedges both engage with the threaded rod. In more detail, movement of the locking actuator in the locking direction correspondingly rotates the threaded rod and transfers its rotation into an upward vertical translation of the lower lock wedge towards the upper lock wedge and a downward vertical translation of the upper lock wedge towards the lower lock wedge along the base alignment axis.

The connector arm assembly also includes an upper lock rod and a lower lock rod. The upper lock rod is horizontally disposed within a cavity of the upper arm extension and is located between a lock rod face of the upper lock wedge and the upper ball of the upper end rod. The lower lock rod is horizontally disposed within a cavity of the lower arm extension and is located between a lock rod face of the lower lock wedge and the lower ball of the lower end rod.

In this way, the upper and lower lock wedges respectively operate as upper and lower cams that convert the vertical translations of the upper and lower lock wedges at their upper and lower lock rod faces into corresponding horizontal axial translations of the upper and lower lock rods. In a similar vein, the upper and lower lock rods respectively operate as upper and lower cam arms that impinge upon the upper ball of the upper end rod and the lower ball of the lower end rod in response to the horizontal axial translations. The result of the horizontal translations locks the rotations of the upper and lower ball joints relative to the upper and lower arm extension axes and locks the positions and degrees of rotation of the upper and lower end rods with respect to the upper and lower ball joints.

In general, according to yet another aspect, an accessory connector includes a connector arm assembly, a helmet attachment clip, and an accessory attachment bar. The connector arm assembly includes an upper body portion and a lower body portion. Each of the body portions include a base and an arm extension (specifically, an upper arm extension and a lower arm extension) that extends from each base. The body portions are also independently rotatable about a common longitudinal axis and are joined at their bases via a hinge joint. The helmet attachment clip connects to a distal end of the upper arm extension, and the accessory attachment bar connects to a distal end of the lower arm extension. Typically, the accessory attachment bar is attached to the extension of the lower body portion of the connector arm assembly.

In one example, when the connector arm assembly is held in an unlocked state, the connector arm assembly is adjustable by a user for positioning an accessory coupled to the accessory attachment bar in an operating position selected by the user. In more detail, the spatial position and orientation of the accessory coupled to the accessory attachment arm can be adjusted with six degrees of freedom or motion.

In one implementation, the accessory is a heads-up display (HUD) device. In another implementation, the HUD device accessory includes a display screen for displaying image frames and an optical waveguide that projects the image frames onto the display screen. Typically, the helmet attachment clip is attached to a front portion of a helmet worn by the user.

In another example, the fixed position and the angular orientation of the accessory attachment bar are persistent over time upon subsequent detachment of the accessory from the accessory attachment bar and upon reattachment of the accessory to the accessory attachment bar. Additionally, when the accessory attachment bar is locked into the operating position selected by the user, the eyesight of the user is unobstructed by the accessory connector when the accessory is detached from the attachment bar.

BRIEF DESCRIPTION OF THE DRAWINGS

The features of the present disclosure will best be understood from a detailed description of the example embodiments thereof selected for the purposes of illustration and shown in the accompanying drawings in which.

DETAILED DESCRIPTION OF SOME EMBODIMENTS OF THE INVENTION

Figure 1:
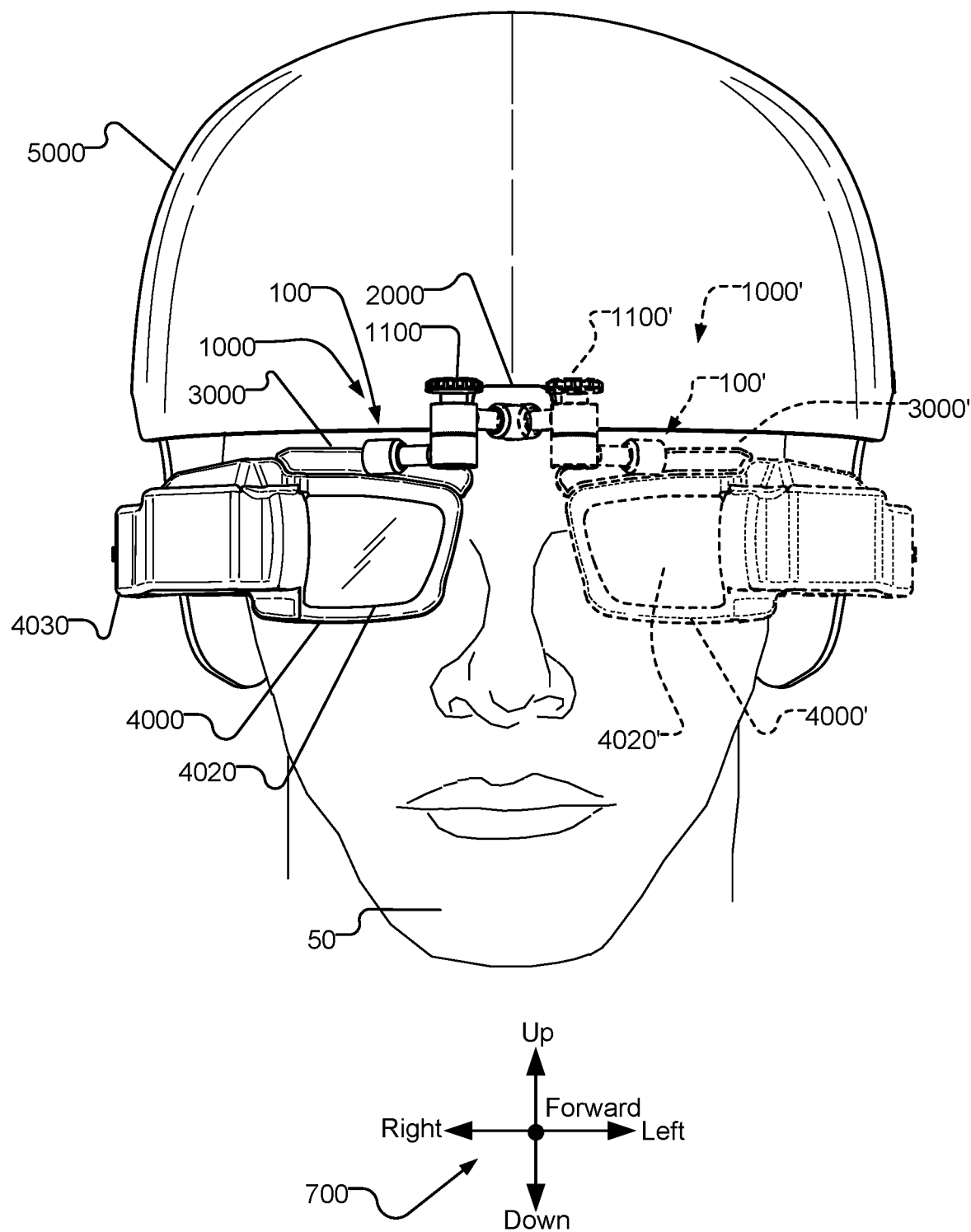
FIG. 1 is a front view of an exemplary accessory connector for connecting a helmet-mounted accessory to a helmet worn by a user, according to an embodiment, where the accessory is a heads-up display (HUD) device.

The subject technology now will be described more fully hereinafter with reference to the accompanying drawings, in which illustrative embodiments are shown. The subject technology may, however, be embodied in many different forms and should not be construed as limited to the embodiments set forth herein; rather, these embodiments are provided so that this disclosure will be thorough and complete, and will fully convey the scope of the subject technology to those skilled in the art.

As used herein, the term "and/or" includes any and all combinations of one or more of the associated listed items. Further, the singular forms and the articles "a", "an." and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element, or intervening elements may be present.

It will be understood that although terms such as "first" and "second" are used herein to describe various elements, these elements should not be limited by these terms. These terms are only used to distinguish one element from another element. Thus, an element discussed below could be termed a second element, and similarly, a second element may be termed a first element without departing from the teachings of the present disclosure.

Unless otherwise defined, all terms (including technical and scientific terms) used herein have the same meaning as commonly understood by one of ordinary skill in the art to which this subject technology belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Overview

According to one embodiment, a helmet-mounted accessory connector useful for removably attaching an accessory to a helmet worn by a user, includes a helmet clip attached to a helmet, an accessory attachment bar for attachment of the accessory, and a connector arm assembly disposed between the helmet clip and the accessory attachment bar and providing a mechanical connection there between. The accessory is removably attached to the accessory attachment bar for attachment or removal by the user.

The connector arm assembly has an unlocked configuration. In the unlocked configuration, the connector arm assembly is adjustable such that the user can manipulate the connector arm assembly with six degrees of freedom to move the accessory attached to the accessory attachment bar into a desired operating position. In a particular embodiment, the accessory is a heads-up display (HUD) device including a transparent display screen, for example a waveguide device, and the user can adjust the connector arm assembly to position the screen of the HUD device in front the user's eye at a desirable distance from the user's eye and at a desired angular orientation relative to the user's eye, described herein as an operating position.

The connector arm assembly also has a locked configuration. In this configuration, all six degrees of freedom of movement of the connector arm assembly are locked in place and the accessory attachment bar is maintained in a fixed position relative to the helmet attachment clip, and the accessory attached to the accessory attachment bar is maintained in a fixed operating position relative to the user's eye. For example, a display screen of an image display device is maintained in a fixed operating position with an angular orientation and translational position of the display screen relative to the user's eye or field of view of the user having been selected by a user locked in place when the connector arm assembly is in the locked configuration. The accessory remains in the fixed operating position even when subjected to vibration, acceleration, and deceleration. For example, the accessory remains in the fixed operating position when subjected to known "shake, rattle, and roll" testing protocols.

The connector arm assembly includes a locking actuator that, when manipulated by a user, transitions the connector arm assembly from a locked configuration to an unlocked configuration. Using only one hand and without using any tools, a user can manipulate the locking actuator to transition the connector arm assembly into the unlocked configuration, move an accessory attached to the accessory attachment portion bar into a desired operating position, and manipulate the locking actuator to transition the connector arm assembly into the locked configuration, thereby locking the connector arm assembly with the transparent display screen of the HUD attached thereto into a user selected operating position.

A helmet-mounted accessory can be attached and detached from the accessory attachment bar. When the connector arm assembly is in a locked configuration, with the helmet-mounted accessory disposed in the user selected operating position, a user can remove the helmet-mounted accessory from the accessory attachment bar using one hand only and without changing the position or orientation of the accessory attachment bar. In this manner, the user can remove the helmet-mounted accessory in less than one second. The user can reattach the accessory to the accessory attachment bar and when the accessory is reattached, the helmet-mounted accessory is still in the previously configured operating position, for example in a desired position, distance, and angular orientation relative to the user's eye. In either case, attaching the accessory to or removing the accessory from the attachment bar, the connector arm assembly remains in the locked configuration.

According to some embodiments, the accessory attachment bar and the accessory each include alignment features. When the accessory is attached to the accessory attachment bar, the alignment features of the accessory attachment bar become mechanically interfaced with corresponding alignment features of the accessory. The alignment features guide the accessory into an operating position that was previously selected by the user before the connector arm assembly was placed in the locked configuration. The alignment features prevent the accessory from moving laterally (i.e. left or right), longitudinally (i.e. up or down), or forwards, or backwards relative to the accessory attachment bar.

In some embodiments, at least one of the accessory attachment elements includes one or more magnets disposed to releasably attach the accessory from the accessory attachment bar. In these embodiments, the alignment and the magnet attachment features prevent detachment of the accessory from the accessory attachment bar unless the accessory is tilted relative to the accessory attachment bar about a predetermined tilt axis, thereby preventing inadvertent detachment of the accessory from the accessory attachment arm due to lateral forces or due to frontward or backward forces applied to the accessory without tilting of the accessory about the predetermined tilt axis.

ITEM NUMBER LIST

The following item numbers are used throughout, unless specifically indicated otherwise.

Figure 4:
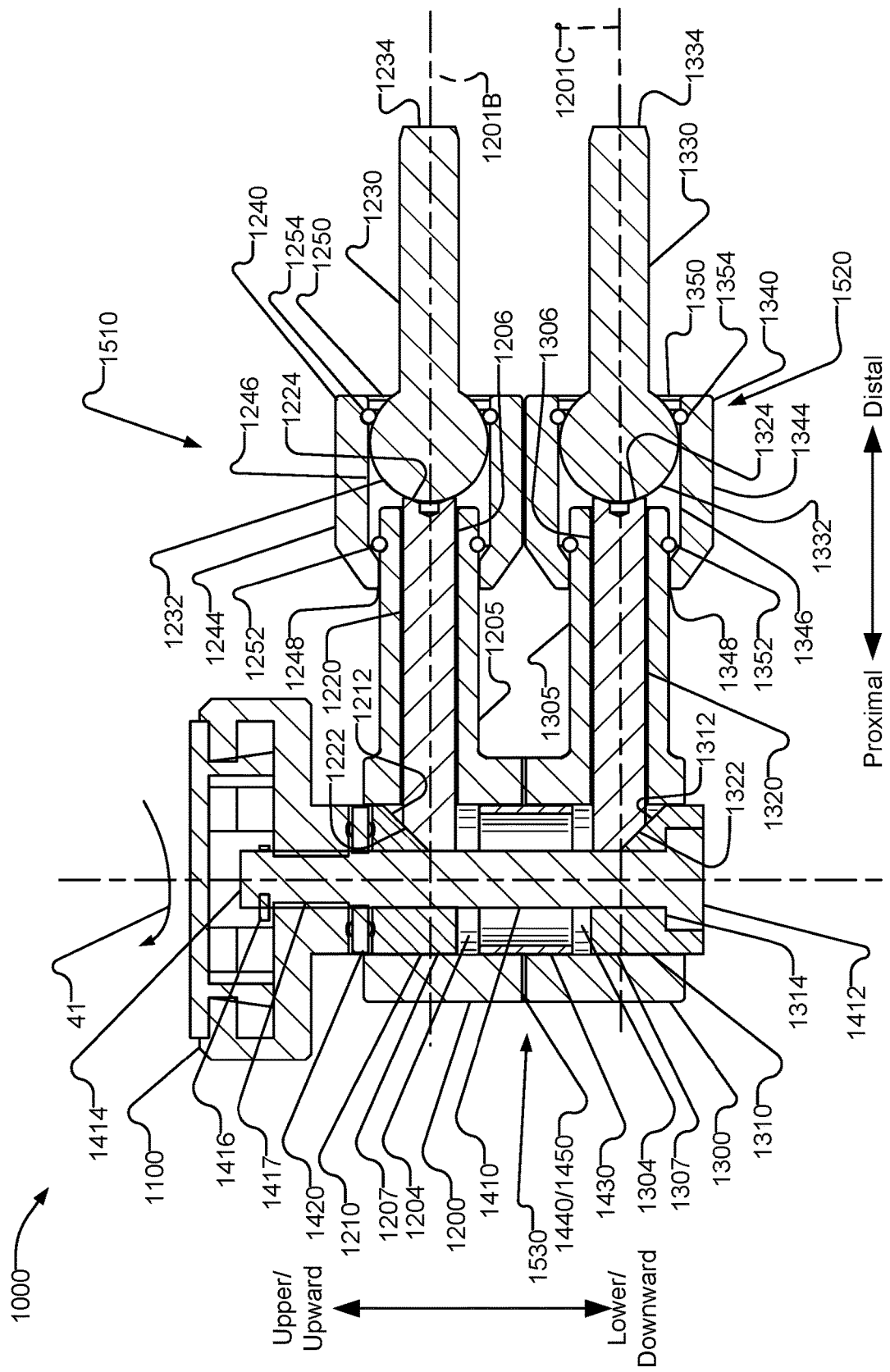
FIGS. 4 and 5 are cutaway side views of the connector arm assembly in FIG. 3A, when the connector arm assembly is shown in an unlocked configuration and in a locked configuration, respectively.
Figure 5:
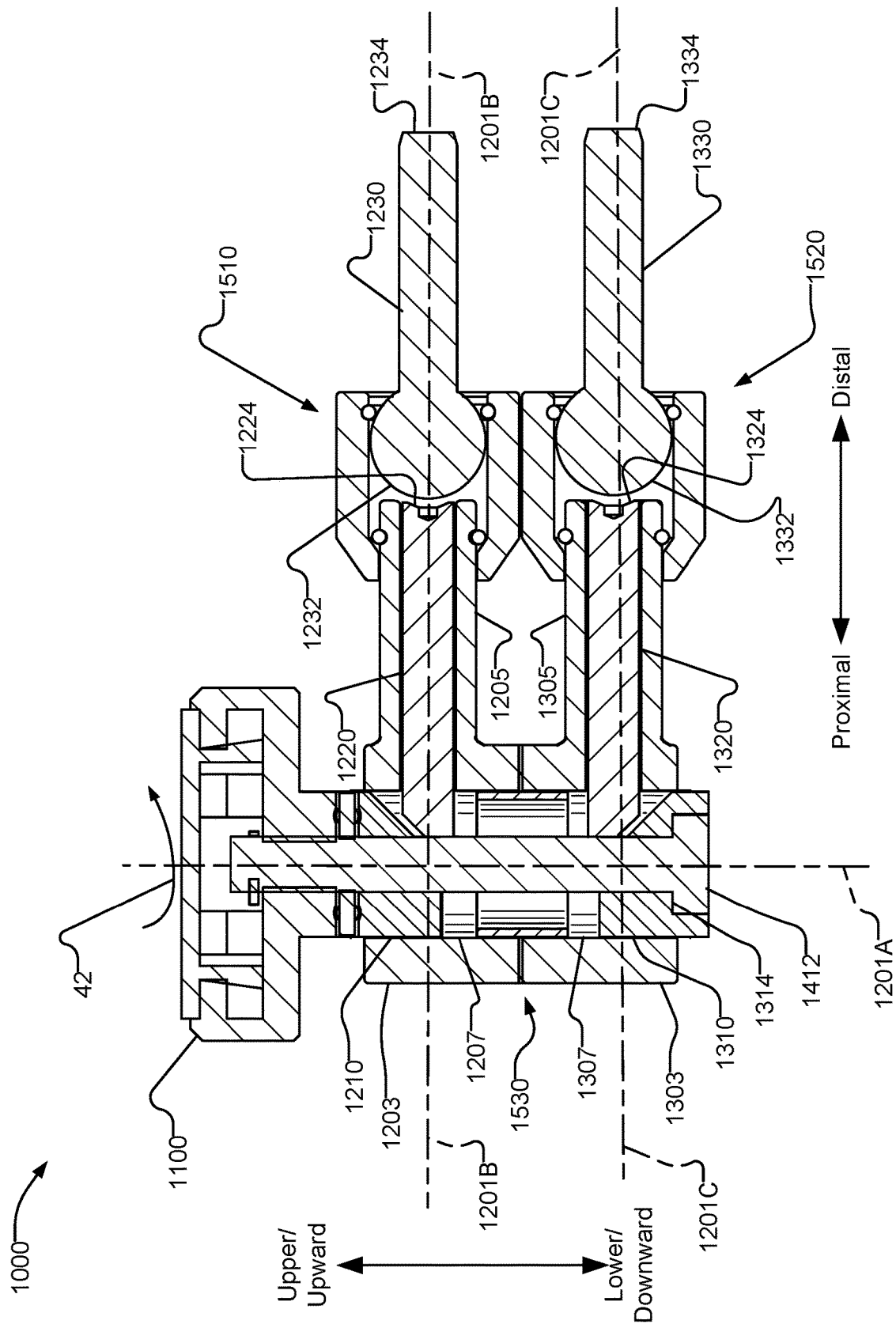
Figure 7:
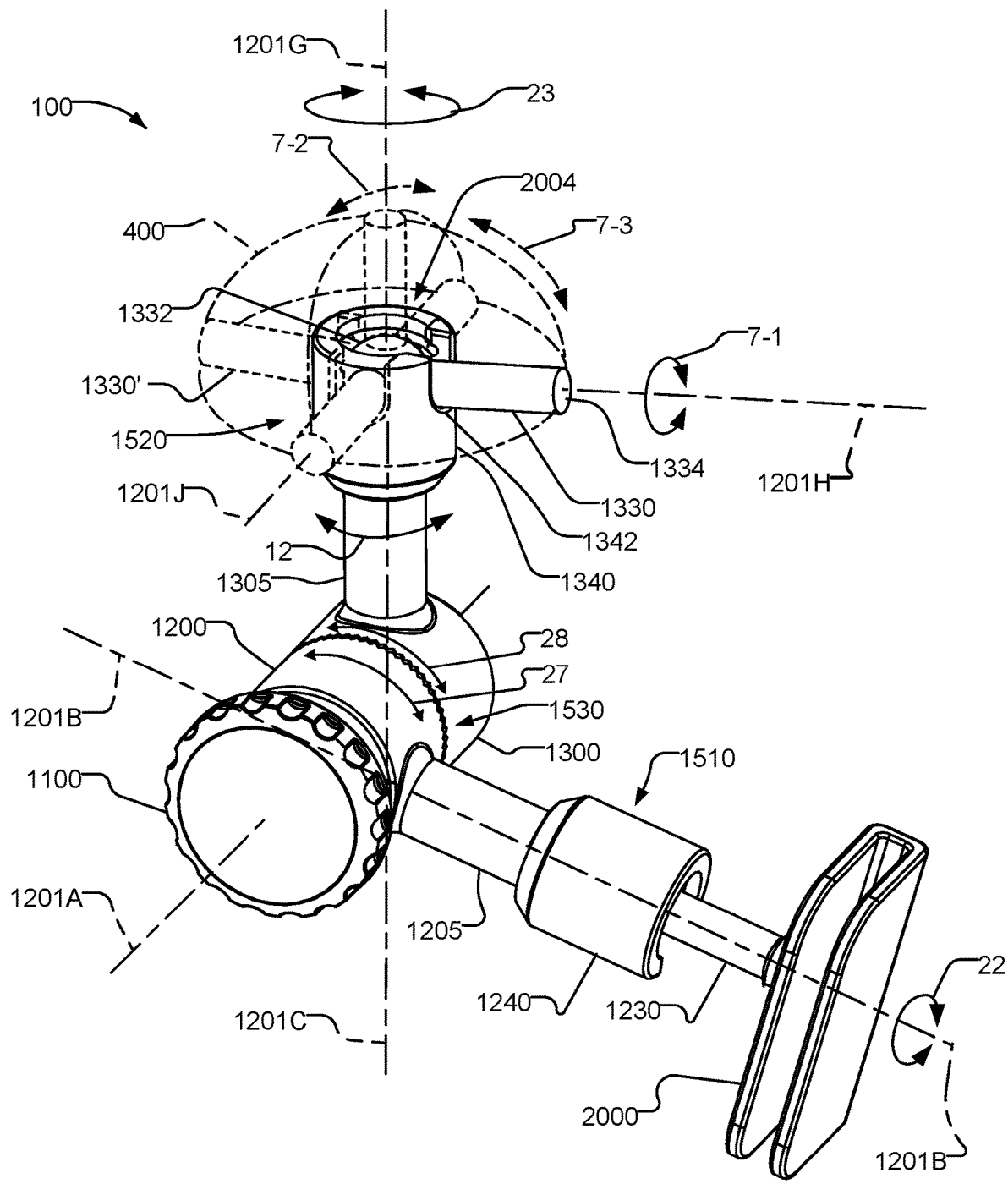
FIG. 7 is a top perspective view of an exemplary accessory connector as in FIG. 2, where the figure illustrates some degrees of freedom of movement of the lower rod end with respect to coordinate axes of the lower ball joint.

| # | DESCRIPTION |
|---|---|
| 12, 22-28 | Directional arrows |
| 7-1, 7-2, 7-3 | Directional arrow FIG. 7 |
| 41-42 | Directional arrow FIGS. 4-5 |
| 50 | User |
| 100 | Accessory connector |
| 200 | Helmet-mounted accessory connector |
| 201 | Helmet-mounted accessory connector |
| 202 | Helmet-mounted accessory connector |
| 300 | Helmet-mounted accessory connector |
| 400 | Virtual surface |
| 500 | HUD system |
| 501 | Helmet network system |
| 502 | Helmet network system |
| 600 | Soldier-portable network system (includes helmet network system 501 and body network system 601) |
| 601 | Body network system |
| 602 | Soldier-portable network system (includes helmet network system 502 and body network system 601) |
| 700 | Axes of movement |
| 1000 | Connector arm assembly |
| 1100 | Locking actuator |
| 1200 | Upper base |
| 1201A | Base alignment axis |
| 1201B | Upper arm extension axis |
| 1201C | Lower arm extension axis |
| 1201D | Upper ball joint axis |
| 1201E | Upper ball joint axis |
| 1201F | Upper ball joint axis |
| 1201G | Lower ball joint axis |
| 1201H | Lower ball joint axis |
| 1201J | Lower ball joint axis |
| 1203 | Upper body portion |
| 1204 | Upper body cavity |
| 1205 | Upper arm extension |
| 1206 | Upper arm extension cavity |
| 1207 | Inner cylindrical face of upper base |
| 1210 | Upper lock wedge |
| 1212 | Lock rod face (of upper lock wedge) |
| 1220 | Upper lock rod |
| 1222 | Primary end of upper lock rod |
| 1224 | Distal end of upper lock rod (upper ball interface end) |
| 1230 | Upper end rod |
| 1232 | Upper ball |
| 1233 | Proximal end of upper end rod |
| 1234 | Distal end of upper end rod |
| 1240 | Upper collar |
| 1242 | Upper collar cutout |
| 1244 | Annular wall |
| 1246 | Upper ball chamber |
| 1248 | Upper proximal aperture |
| 1250 | Upper distal aperture |
| 1252 | Upper collar retaining clip |
| 1254 | Upper ball retaining clip |
| 1300 | Lower base |
| 1303 | Lower body portion |
| 1304 | Lower body cavity |
| 1305 | Lower arm extension |
| 1306 | Lower arm extension cavity |
| 1307 | Inner cylindrical face of lower base |
| 1310 | Lower lock wedge |
| 1312 | Lock rod face (of lower lock wedge) |
| 1314 | Threaded rod interface (of lower lock wedge) |
| 1320 | Lower lock rod |
| 1322 | Proximal end of lower lock rod |
| 1324 | Distal end of lower lock rod (lower ball interface end) |
| 1330 | Lower end rod |
| 1332 | Lower ball |
| 1333 | Proximal end of lower end rod |
| 1334 | Distal end of lower end rod |
| 1340 | Lower collar |
| 1342 | Lower collar cutout |
| 1344 | Annular wall |
| 1346 | Lower chamber |
| 1348 | Lower proximal aperture |
| 1350 | Lower distal aperture |
| 1352 | Lower collar retaining clip |
| 1354 | Lower ball retaining clip |
| 1410 | Threaded rod |
| 1412 | Threaded rod head |
| 1414 | Upper end of threaded rod |
| 1416 | Retaining ring |
| 1417 | Threaded interface |
| 1420 | Thrust bearing |
| 1430 | Hinge sleeve |
| 1440 | Friction gasket |
| 1450 | Toothed interface |
| 1452 | Upper teeth |
| 1454 | Lower teeth |
| 1470 | Lower face of the upper |

-continued

| # | DESCRIPTION |
|---|---|
| | base 1200 |
| 1510 | Upper ball joint |
| 1520 | Lower ball joint |
| 1530 | Hinge joint |
| 1570 | Upper face of the lower base 1300 |
| 2000 | Helmet attachment clip |
| 2005 | Attachment sleeve |
| 3000 | Accessory attachment bar |
| 3005 | Attachment sleeve |
| 3100 | Bottom surface of accessory attachment bar |
| 3122 | Attachment bar magnet |
| 3124 | Attachment bar magnet |
| 3132 | Attachment bar alignment feature |
| 3134 | Attachment bar alignment feature |
| 4000 | Accessory (such as a HUD device accessory) |
| 4001 | Accessory |
| 4002 | Accessory |
| 4020 | Display screen |
| 4030 | Image rendering element |
| 4100 | Top surface of accessory |
| 4122 | Accessory magnet |
| 4124 | Accessory magnet |
| 4132 | Accessory alignment feature |
| 4134 | Accessory alignment feature |
| 4200 | HUD User interface |
| 4201 | HUD device profile sending unit |
| 4202 | HUD device profile sending unit |
| 4208 | Profile selection buttons (of HUD device profile sending unit(s)) |
| 4300 | First HUD cable |
| 4301 | First HUD cable |
| 4302 | First HUD cable |
| 4310 | First cable processing device (e.g. FPGA) |
| 4311 | First cable processing device (e.g. FPGA) |
| 4312 | First cable processing device (e.g. FPGA) |
| 4320 | Second cable processing device (e.g. FPGA) |
| 4321 | Second cable processing device (e.g. FPGA) |
| 4322 | Second cable processing device (e.g. FPGA) |
| 4350 | Electrical connector |
| 4355 | 1$^{st}$ Connector portion |
| 4360 | 2$^{nd}$ Connector portion |
| 4400 | Second HUD cable |
| 4401 | Second HUD cable |
| 4402 | Second HUD cable |
| 4410 | Third HUD cable |
| 4411 | Third HUD cable |
| 4412 | Third HUD cable |
| 5000 | Helmet |
| 5100 | Stow pouch |
| 5120 | Front flap |
| 5200 | Helmet electronic controller |
| 5220 | Helmet processor (of controller) |
| 5224 | Helmet memory (of controller) |
| 5230 | Inertia Movement Unit (IMU) (of controller) |
| 5240 | Helmet network interface device (router) |
| 5300 | Battery |
| 5400 | Helmet-mounted sensors and transducers |
| 5402 | Energy detector |
| 5404 | Electrochemical detector |
| 5406 | Global Position Sensor (GPS) |
| 5408 | Illuminator |
| 5410 | User Microphone |

-continued

| # | DESCRIPTION |
|---|---|
| 5412 | Helmet mounter microphones |
| 5414 | User speakers |
| 6240 | Body network interface device (router) |
| 6400 | External sensors |
| 6402 | Biometric sensors |
| 6404 | Electrochemical sensors |
| 6406 | Body cameras |
| 6408 | User-worn microphones |
| 6410 | Electromagnetic energy detecting sensors |
| 6412 | Temperature sensors |
| 6414 | Positioning (GPS) sensors |
| 6500 | Internet Protocol (IP) Radio |
| 7110 | Night vision sensor |
| 7210 | First night vision sensor |
| 7220 | Second night vision sensor |
| 8000 | End User Device (EUD) |
| 8220 | EUD processor |
| 8224 | EUD Memory |
| 8230 | Cellular network interface device |
| 8235 | User microphone |
| 8240 | User speaker |
| 8245 | Camera |
| 8250 | Display screen |
| 8310 | situational awareness application |
| 8320 | HUD device profile editor application |
| 8330 | Operating System (OS) |
| 8340 | Speech to text application |
| 8410 | EUD User Interface (UI) |

Component Materials

The following table includes a list of exemplary materials used to form some components

| # | Item | Exemplary material(s) |
|---|---|---|
| 1100 | Locking actuator (knob) | Stainless steel |
| 1200 | Upper base | Aluminum |
| 1210 | Upper lock wedge | Steel |
| 1220 | Upper lock rod | Steel |
| 1230 | Upper end rod | Aluminum |
| 1240 | Upper collar | Aluminum |
| 1300 | Lower base | Aluminum |
| 1310 | Lower lock wedge | Steel |
| 1320 | Lower lock rod | Steel |
| 1330 | Lower end rod | Aluminum |
| 1340 | Lower collar | Aluminum |
| 1410 | Threaded rod | Steel (hex head bolt) |
| 1416 | Retaining ring | Steel |
| 1420 | Thrust bearing | Ball bearing material = steel |
| 2000 | Helmet attachment clip | Aluminum |
| 3000 | Accessory attachment bar | Aluminum |
| 3122 | Attachment bar magnet | Rare earth magnet |
| 3124 | Attachment bar magnet | Rare earth magnet |
| 4000 | Accessory (e.g., Waveguide) | Aluminum (housing material) |
| 4122 | Accessory magnet | Rare earth magnet |
| 4124 | Accessory magnet | Rare earth magnet |
| 4132 | Accessory alignment feature | Aluminum |
| 4134 | Accessory alignment feature | Aluminum |
| 5100 | Stow pouch | Cloth, leather, or durable synthetic material (e.g. plastic) |

Exemplary Helmet-Mounted Accessory Connector Arrangement

FIG. 1 shows a helmet 5000 worn by a user 50. A helmet-mounted accessory 4000 (accessory) is attached to the helmet 5000 via an accessory connector 100. The accessory 4000 is shown mounted in an operating position in front of the user's right eye. In one example, as shown, the accessory 4000 is a heads-up display (HUD) device. The HUD device includes a transparent display screen 4020, hereinafter display screen, attached to an image rendering element 4030. The image rendering element 4030 is configured to receive image data from an image data source and to display an image corresponding with the image data onto the display screen 4020.

The accessory connector 100 enables attachment of the accessory 4000 to the helmet 5000 and has various components. The accessory connector 100 includes a connector arm assembly 1000, an accessory attachment bar 3000 and a helmet attachment clip 2000. A locking actuator 1100 of the connector arm assembly 1000 is also shown. The accessory 4000 (here, the HUD device) is configured to attach to the accessory attachment bar 3000, and the connector arm assembly 1000 attaches to the helmet 5000 via the helmet attachment clip 2000. Thus, the connector arm assembly 1000 attaches to both the helmet attachment clip 2000 and to the accessory attachment bar 3000 and is disposed therebetween. As will be described below, the accessory arm assembly 1000 provides six degrees of freedom of movement of the accessory 4000 with respect to the helmet attachment clip 2000. Additionally, a single locking actuator 1100 is configured to lock all six degrees of freedom of movement simultaneously.

The image rendering element 4030 may include a raster image or other image digital processing device, a data memory module, and a network interface device. One such device is available from company name; "LUMUS", of Ness Ziona, Israel. A non-limiting exemplary HUD device is LUMUS Model OE50 which is a color transparent display device having image resolution of 1280×720 pixels and a Field of View diagonal of 40 degrees with an image brightness of 4000 candelas per square meter, (referred to as 4000 nit). The transparent display device comprises Low Emission (Low-E) glass configured for high transmission of visible light and high reflection of mid- and far-infrared rays. The Low-E glass thickness is 1.6 mm. Other transparent display screens are usable without deviating from the present technology.

In another example, the accessory 4000 is an image enhancement device such as a night vision device or an image magnifying device, an image capture device, or the like. In a further example, the accessory includes a HUD and an image enhancement device, for example as a combination device. In one example, the image enhancement device and the HUD are housed within a single housing, with the single housing attached to the accessory attachment bar 3000. Alternately, the image enhancement device and the HUD are separate devices that are each configured to attach to the accessory attachment bar at different times wherein the two devices can be swapped by the user as needed.

In a non-limiting exemplary embodiment, the accessory 4000 is a HUD device accessory 4000 which includes a transparent display screen 4020 and an image rendering element 4030. The display screen 4020 is an electronic transparent display that present image frames to the user. The image rendering element 4030 receives image data from an image data source and submits image frames to the display screen 4020. The display screen is positioned in an operating position for visual consumption by the user 50. With the display screen positioned in the operating position, the user can view the world through the transparent display screen 4020 and see the image presented on the display screen by the image rendering element 4030. Preferably, with the display screen positioned in the operating position the user can focus on far field objects or on the screen image without the user's having to move their head or avert their gaze to do so. As described below, when the connected arm assembly is in the unlocked configuration, the user 50 can position the viewing screen 4020 in three-dimensional space and at an angular orientation relative to the user's eye to enable comfortable viewing of data and other content displayed on the display screen 4020 and then lock the connected arm assembly, the locked configuration, when the user-selected operating position is established. Thereafter, the user can detach and reattach the accessory to the accessory attachment bar and the accessory will still be in the user-selected operating position.

The accessory may instead be mounted in front of the user's left eye, as shown in phantom in FIG. 1. Here, a second accessory 4000' connects to the helmet 5000 using second accessory connector 100'. A second connector arm assembly 1000', second locking actuator 1100' and second accessory attachment bar 3000' of the second connector arm assembly 1000' are also shown.

Figure 17:
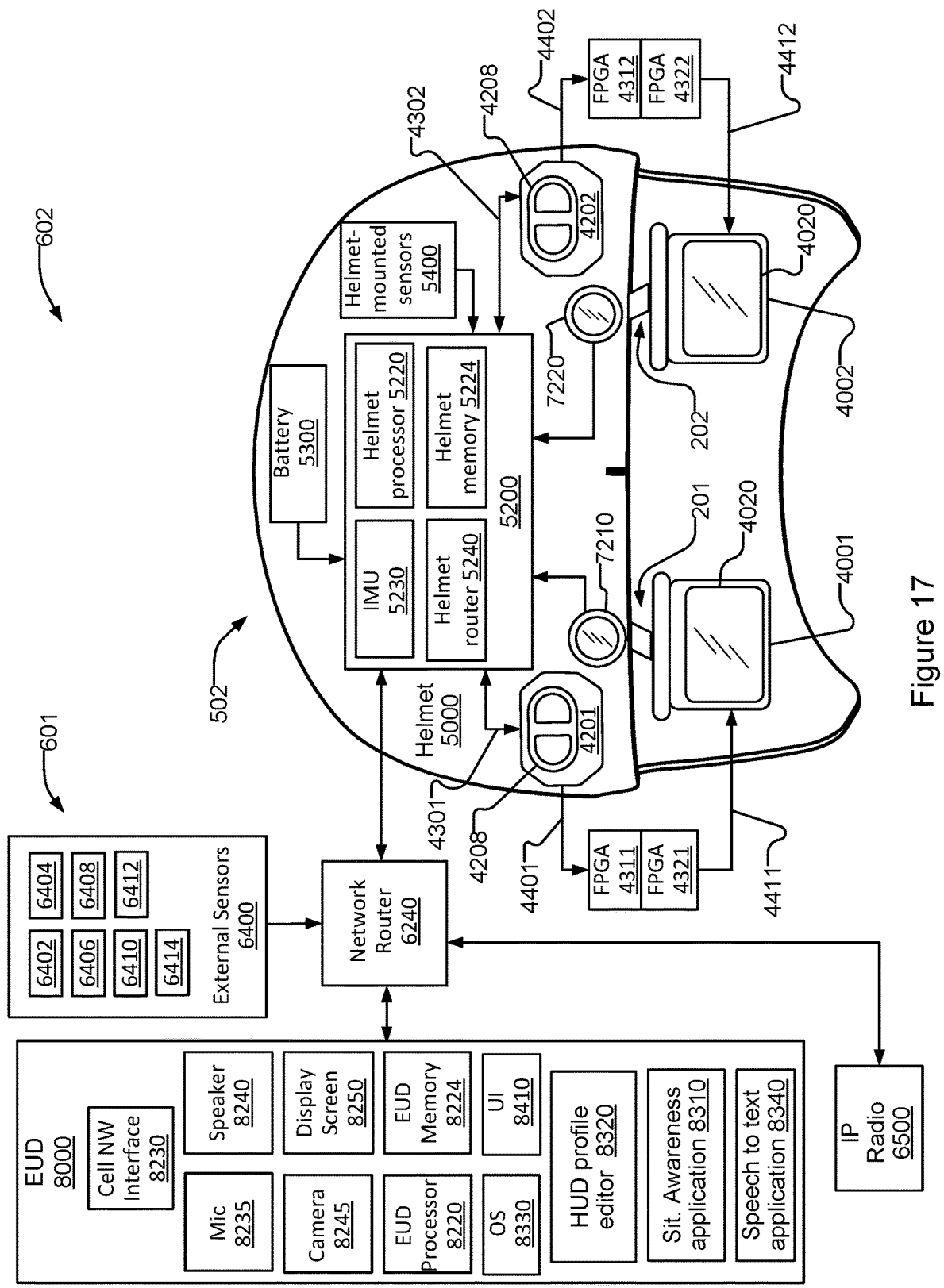
FIG. 17 is a schematic diagram of a soldier-portable network system, according to another embodiment, where the soldier-portable network system includes yet another embodiment of a HUD system.

It can also be appreciated that two accessories 4000, 4000' can be mounted on the same helmet 5000, i.e. a first accessory 4000 is mounted in front of the user's right eye via accessory connector 100 and a second accessory 4000' is mounted in front of the user's left eye via the second accessory connector 100'. In one example, the accessories 4000, 4000' might both be HUD devices. In another example, accessory 4000 is a HUD device while accessory 4000' is an image enhancement device. In one implementation, the accessory connectors 100, 100' would each attach to the helmet via a common helmet attachment clip 2000 when the helmet attachment clip 2000 includes attachment points for two accessory connectors 100, 100'. In another implementation, each of the accessory connectors 100, 100' would attach to the helmet via separate helmet attachment clips 201, 202' e.g. as shown in FIG. 17.

Axes of movement 700 or translation, of both the connector 100 and the accessory 4000 relative to the helmet 5000 are also shown. These axes of movement include an up direction, down direction, left direction, right direction, forward direction, and rearward direction. In more detail, in examples, forward is a direction perpendicular to and pointing out of the page and rearward is a direction perpendicular to and pointing into the page.

The user 50 can position and reposition the accessory attachment bar 3000 and an accessory 4000 attached to the accessory attachment bar 3000 in multiple directions of translation along the axes of movement. These directions include right, left translation, up, down translation, forward, and rearward translation. The user 50 can further adjust angular orientation or rotation of various portions of the connector arm assembly about the axes of movement to rotate the accessory attachment bar 3000 and an accessory 4000 attached thereto with respect to the helmet.

Once the accessory 4000 is positioned in a desired location and orientation, e.g. the operating position, the user 50 can operate a locking actuator 1100 to place the connector arm assembly 1000 in a locked configuration. Once the connector arm assembly 1000 is in the locked configuration, the accessory 4000 remains in the operating position until it is either removed from the accessory attachment bar 3000 or until the user 50 operates the locking actuator 1100 to unlock the connector arm assembly to readjust the desired operating position.

Figure 2:
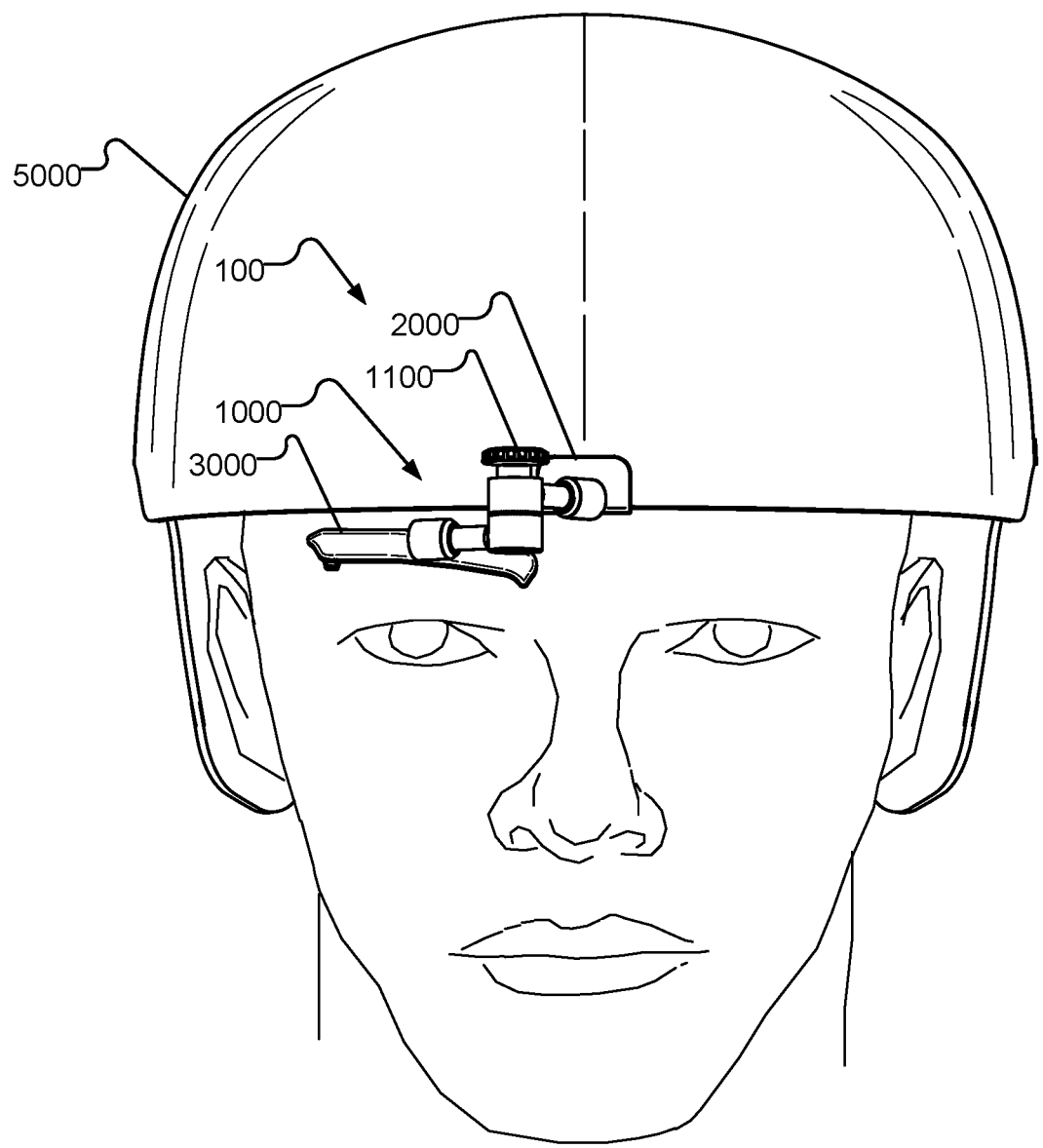
FIG. 2 is a front view of an exemplary accessory connector attached to a helmet as in FIG. 1, where the accessory connector is shown without an accessory attached.

FIG. 2 also shows an accessory connector 100 attached to a helmet 5000 worn by a user 50. This figure illustrates that the accessory 4000 can be removed from the accessory attachment bar 3000. When the accessory connector 100 is attached to the helmet with no accessory 4000 attached to the accessory attachment bar 3000, the eyesight of the user is unobstructed by the accessory connector 100. In some additional embodiments (not shown), the accessory connector 100 can be connected to a head-worn article other than a helmet. In examples, the accessory connector 100 can be connected to a hat, to eye wear, to a helmet visor, or to a head-worn article with a headband configuration.

The connector arm assembly 1000 includes the locking actuator 1100, for example a lock knob, which can be manipulated by the user 50 into both a locking position and an unlocking position. In an exemplary embodiment, the locking actuator 1100 is a rotatable lock knob and the user 50 can manipulate the locking actuator into a locking position by turning the lock knob in a first rotational direction, e.g., in a clockwise direction. When the locking actuator 1100 is in the locking position, the connector arm assembly 1000 is in a locked configuration wherein the accessory attachment bar 3000 is held in a fixed position and angular orientation.

In this embodiment, the user 50 can manipulate the locking actuator 1100 into an unlocking position by turning the lock knob in a second rotational direction, e.g., in a counterclockwise direction. When the locking actuator 1100 is in an unlocking position, the connector arm assembly 1000 is in an unlocked configuration wherein the accessory attachment bar 3000 is movable to adjust its position and angular orientation.

The user 50 can manipulate the locking actuator 1100 into a locking position and into an unlocking position using one hand, for example by turning the lock knob in a locking direction, and in an unlocking direction, using fingers of one hand.

When the connector arm assembly 1000 is in the unlocked configuration, the user 50 can manipulate the connector arm assembly to position and reposition the accessory attachment bar 3000, and an accessory 4000 attached thereto, relative to the helmet 5000 and to the user's eye. The user 50 can position and reposition the accessory 4000 using one hand. Positioning and repositioning the accessory 4000 includes changing a position of the accessory 4000 in three-dimensional space relative to the helmet 5000 or to the user's eye, and/or changing an angular orientation of the accessory 4000 relative to one or more axes of rotation or relative to the helmet or the user's eye or a gaze vector thereof.

The accessory attachment bar 3000 allows one-handed removal and replacement of accessories 4000 by the user 50, without changing the connector arm assembly 1000 from a locked configuration. Upon removal of an accessory 4000 in this manner, the accessory attachment bar 3000 remains in the same position and angular orientation it was in when the accessory 4000 was attached. Furthermore, the accessory attachment bar 3000 is out of the line of sight of the user 50 and does not obstruct the user's view when the accessory 4000 is removed.

The user 50 can later reattach the accessory 4000 to the accessory attachment bar 3000. Because the accessory attachment bar 3000 has remained in the same fixed position and orientation while the accessory 4000 was detached, the reattached accessory 4000 will be in the same position and orientation relative to the user's eye as it was prior to being detached. In an exemplary embodiment, the accessory 4000 is a HUD device, for example a transparent waveguide projector.

A typical example of how the user 50 operates the accessory connector 100 is as follows. In the example, the accessory is a HUD device attached to the attachment bar 3000. First, the user 50 adjusts the connector arm assembly 1000, using one hand, to place the display screen 4020 of the HUD device accessory 4000 in a desired operating position and angular orientation relative to the user's eye, e.g., such that information displayed on the display screen 4020 is positioned at a desired location within the user's field of view and is clearly readable to the user. The user 50 then operates the locking actuator 1100, using the other hand, to lock the position and orientation of the display screen 4020 in place, thus placing the connector arm assembly 1000 in a locked configuration and positioning the display screen 4020 in an operating position selected by the user.

Once the connector arm assembly 1000 is in a locked configuration, the user 50 can quickly remove the HUD device 4000 from the accessory attachment bar 3000 to move the HUD device out of the user's field of view. The user can later reattach the HUD device accessory 4000 to the accessory connector bar 3000. After the user 50 reattaches the HUD device accessory 4000, its display screen 4020 will be placed in the operating position selected by the user without requiring further manipulation of the connector arm assembly 1000 or adjustment of the accessory attachment bar 3000.

The accessory 4000 is electrically interfaced with a network interface device or with a local controller to receive image data therefrom. In an example, the accessory is interfaced with a data processor, a network interface device, or both. Additionally, the accessory may be electrically interfaced with an energy storage device, e.g. a rechargeable battery attached to the helmet or the accessory. In the present example, a helmet processor, described below, is attached the helmet and the helmet processor is configured to generate image data streams corresponding with images to be displayed by the HUD accessory. The images may include one or more standard data display elements, e.g. a compass or a clock that continuously display compass directions and time of day on the HUD display screen.

Configuration of an Exemplary Connector Arm Assembly

Figures 3A, 3B, 3C:
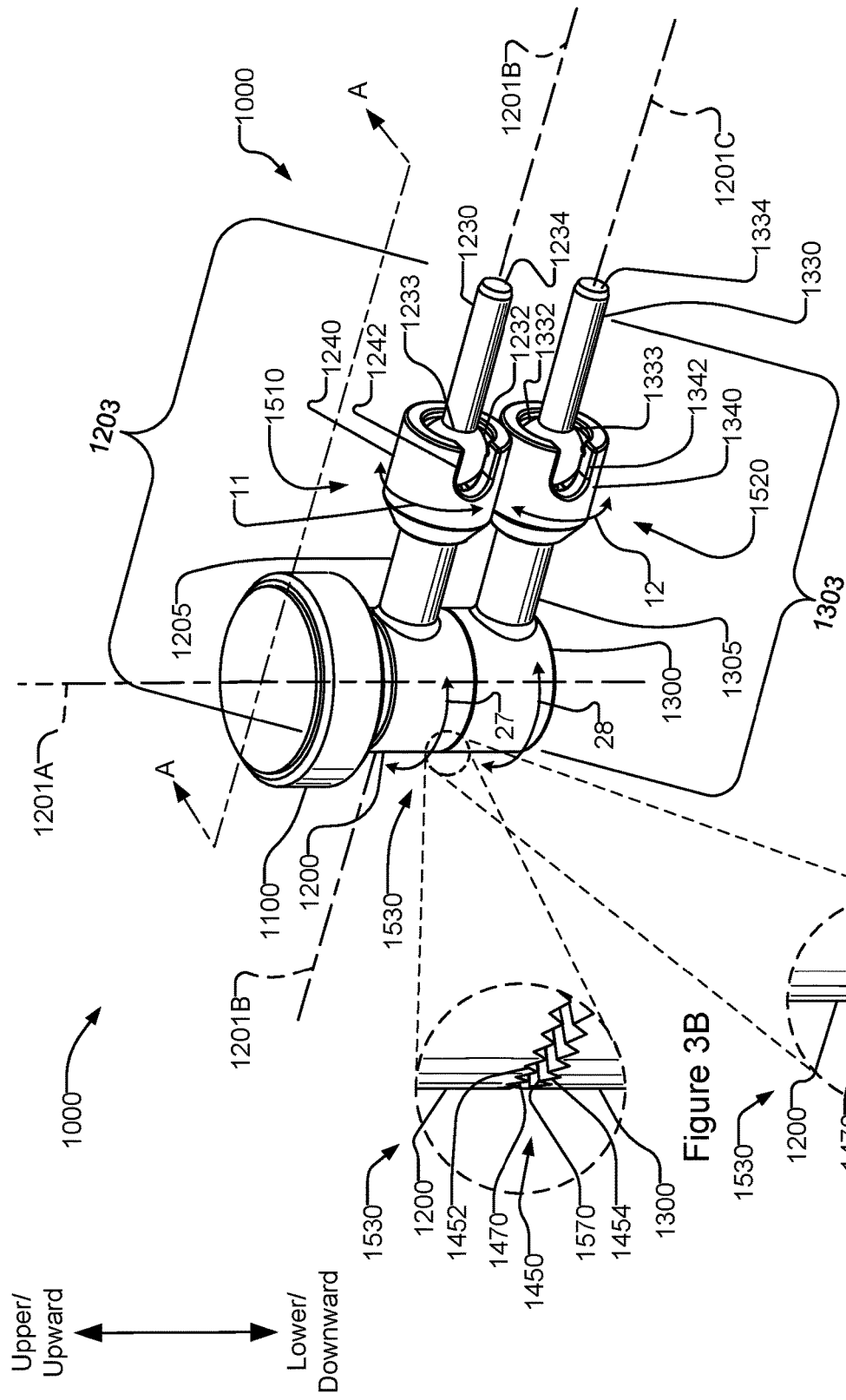
FIG. 3A is a perspective view of an exemplary connector arm assembly of the accessory connector, according to an embodiment.
FIGS. 3B and 3C are enlarged inset perspective views of different locking interfaces of the connector arm assembly in FIG. 3A, according to embodiments.

FIG. 3A is a perspective view of the connector arm assembly 1000. FIGS. 4 and 5 are cutaway side views of the connector arm assembly in FIG. 3A, where the connector arm assembly is shown in an unlocked configuration in FIG. 4 and in a locked configuration in FIG. 5. The connector arm assembly 1000 includes an upper body portion 1203 and a lower body portion 1303.

The upper body portion 1203 includes an upper base 1200 and an upper arm extension 1205 which extends from the upper base 1200. The lower body portion 1303 includes a lower base 1300 and a lower arm extension 1305 that extends from the lower base 1300. Preferably, upper base 1200 and lower base 1300 are each formed with a substantially cylindrical upper annular base wall and lower annular base wall enclosing an open ended upper cylindrical cavity 1204, and an open ended lower cylindrical cavity 1304, shown in FIG. 4. The upper and lower annular walls and upper and lower cylindrical cavities 1204, 1304 are longitudinally aligned along a common base alignment axis 1201A. In exemplary embodiments, the upper arm extension 1205 extends perpendicularly from the upper annual wall of the upper base 1200 and the lower arm extension 1305 extends perpendicularly from the lower annular wall of the lower base 1300. The upper and lower arm extensions 1205, 1305 are fixedly attached to their respective bases 1200, 1300. The upper arm extension 1205 extends along an upper arm extension axis 1201B and the lower arm extension 1305 extends along a lower arm extension axis 1201C.

A hinge joint 1530, shown in FIGS. 3B and 3C, is disposed between the upper and lower bases 1200, 1300 and includes a toothed locking interface 1450. The upper and lower body portions 1203, 1303 are independently rotatable about the base alignment axis 1201A when the connector arm assembly 1000 is in an unlocked state or configuration. When the connector arm assembly 1000 is in a locked state or configuration, upper and lower body portions 1203, 1303 are joined at their respective bases 1200, 1300 via the hinge joint 1530 and the toothed locking interface 1450 which prevents rotation of both bases 1200 and 1200 about the base alignment axis 1201A. In the locked state, a longitudinal axis of each base 1200, 1300 is aligned coaxially with the base alignment axis 1201A that passes vertically through a center of each of the upper and lower bases 1200, 1300.

The bases 1200, 1300 each independently rotate 360 degrees around the base alignment axis 1201A when the connector arm assembly 1000 is in the unlocked configuration. The rotation of the upper base 1200 and thus rotation of the entire upper body portion 1203 and the upper arm extension 1205 with respect to the base alignment axis 1201A, is indicated by an arrow with reference 27. The rotation of the lower base 1300, and thus rotation of the entire lower body portion 1303 and the lower arm extension 1305 with respect to the base alignment axis 1201A, is indicated by an arrow with reference 28.

An upper ball joint 1510 includes an upper end rod 1230 fixedly attached to an upper ball 1232, and an upper collar 1240. The upper ball joint 1510 is rotatably attached to a distal end of the upper arm extension 1205. A lower ball joint 1520 includes lower end rod 1330 fixedly attached with a lower ball 1332, and a lower collar 1340. The lower ball joint 1520 is rotatably attached to a distal end of the lower arm extension 1305.

The upper arm extension 1205 has a proximal end and a distal end and extends along an upper arm extension axis 1201B, orthogonal to the base alignment axis 1201A. The upper arm extension proximal end attaches to the upper base 1200 and the upper arm extension distal end engages with the upper ball joint upper collar 1240. A length of the upper arm extension 1205 runs from its proximal to distal end. Similarly, the lower arm extension 1305 has a proximal end and a distal end and extends along a lower arm extension axis 1201C, orthogonal to the base alignment axis 1201A. The lower arm extension proximal end attaches to the lower base 1300 and the lower arm extension distal end engages with the lower ball joint lower collar 1340. A length of the lower arm extension 1305 runs from its proximal to distal end.

The upper end rod 1230 has a proximal end 1233 and a distal end 1234. The upper end rod 1230 attaches to the upper ball 1232 at its proximal end 1233. A length of the upper end rod 1230 runs from its proximal to distal end. The distal end 1234 of the upper end rod 1230 attaches to either the helmet attachment clip 2000 (shown in FIG. 1) or to the accessory attachment arm 3000. Similarly, the lower end rod 1330 has a proximal end 1333 and a distal end 1334. The lower end rod 1330 attaches to the lower ball 1332 at its proximal end 1333. A length of the lower end rod 1330 runs from its proximal to distal end. The distal end 1334 of the lower end rod 1330 attaches to the accessory attachment bar 3000 or to the helmet attachment clip 2000, (shown in FIG. 1).

Turning to FIG. 4 and FIG. 5, the upper collar 1240 comprises an annular wall 1244 enclosing an open-ended upper ball chamber 1246. The upper collar 1240 has a proximal end and a distal end. The upper collar proximal end forms a proximal aperture 1248 sized to receive the distal end of the upper arm extension 1205 there through. An upper collar retaining clip 1252 engages with the distal end of the upper arm extension inside the upper ball chamber 1246. A perimeter external dimension of the upper collar retaining clip 1252 is formed larger than a perimeter internal dimension of the collar proximal aperture 1248 to prevent the upper collar 1240 from separating from the distal end of the upper arm extension 1205. The upper collar distal end forms an upper distal aperture 1250 sized to receive the upper ball 1232 there through. The upper end rod 1230 extends from the upper distal aperture 1250. An upper ball retaining clip 1254 engages with the distal end of the ball chamber annular wall 1244 inside the upper ball chamber 1246. A perimeter internal dimension of the ball retaining clip 1254 is formed larger than a perimeter external dimension of the upper ball 1232 to prevent the upper ball from exiting from the upper ball chamber through the upper distal aperture 1250.

Similarly, the lower collar 1340 comprises an annular wall 1344 enclosing an open-ended lower ball chamber 1346. The lower collar has a proximal end and a distal end. The lower collar proximal end forms a lower proximal aperture 1348 sized to receive the distal end of the lower arm extension 1305 there through. A lower collar retaining clip 1352 engages with the distal end of the lower arm extension inside the lower ball chamber 1346. A perimeter external dimension of the lower collar retaining clip 1352 is formed larger than a perimeter internal dimension of the collar proximal aperture 1348 to prevent the lower collar 1340 from separating from the distal end of the lower arm extension 1305. The lower collar distal end forms a lower distal aperture 1350 sized to receive the lower ball 1332 there through. The lower end rod 1330 extends from the lower distal aperture 1350.

A lower ball retaining clip 1354 engages with the distal end of the ball chamber annular wall 1344 inside the lower ball chamber 1346. A perimeter internal dimension of the ball retaining clip 1354 is formed larger than a perimeter external dimension of the lower ball 1332 to prevent the lower ball from exiting from the lower ball chamber through the lower distal aperture 1350. The upper and lower collars 1240, 1340 include upper and lower collar cutouts 1242, 1342. The upper and lower collar cutouts 1242, 1342 are formed in the upper and lower collars 1240, 1340 to penetrate the annular walls 1240 and 1340 and the distal apertures 1250 and 1350. The upper collar cutout 1242 is sized to receive an external perimeter of the upper end rod 1230 therein when the upper ball 1232 and upper end rod 1230 are rotated to at least partially engage the external perimeter of the upper end rod 1230 with the upper cutout 1242. The lower collar cutout 1342 is sized to receive an external perimeter of the lower end rod 1330 therein when the lower ball 1332 and lower end rod 1330 are rotated to at least partially engage the external perimeter of the lower end rod 1230 with the lower cutout 1342.

The upper collar 1240, the upper ball 1232 and the attached upper arm extension 1230 form the upper ball joint 1510. The upper collar cutout 1242 enables rotation of the upper ball 1232 to rotate the upper arm extension 1205 from substantially coaxial with the upper extension axis 1201B to substantially orthogonal with the upper extension axis 1201B when the upper arm extension 1205 is fully engaged with the upper collar cutout 1242. Similarly, the lower collar 1340, the lower ball 1332 and the attached lower arm extension 1330 form the lower ball joint 1520. The lower collar cutout 1342 enables rotation of the lower ball 1332 to rotate the lower arm extension 1305 from substantially coaxial with the lower extension axis 1201C to substantially orthogonal with the lower extension axis 1201C when the lower arm extension 1305 is fully engaged with the lower collar cutout 1342.

Line A-A in FIG. 3A indicates a cross section of the connector arm assembly 1000. The cross section defines a plane through the connector arm assembly 1000 that includes each of the base alignment axis, the upper arm extension axis 1201B and the lower arm extension 1201C.

Figure 6:
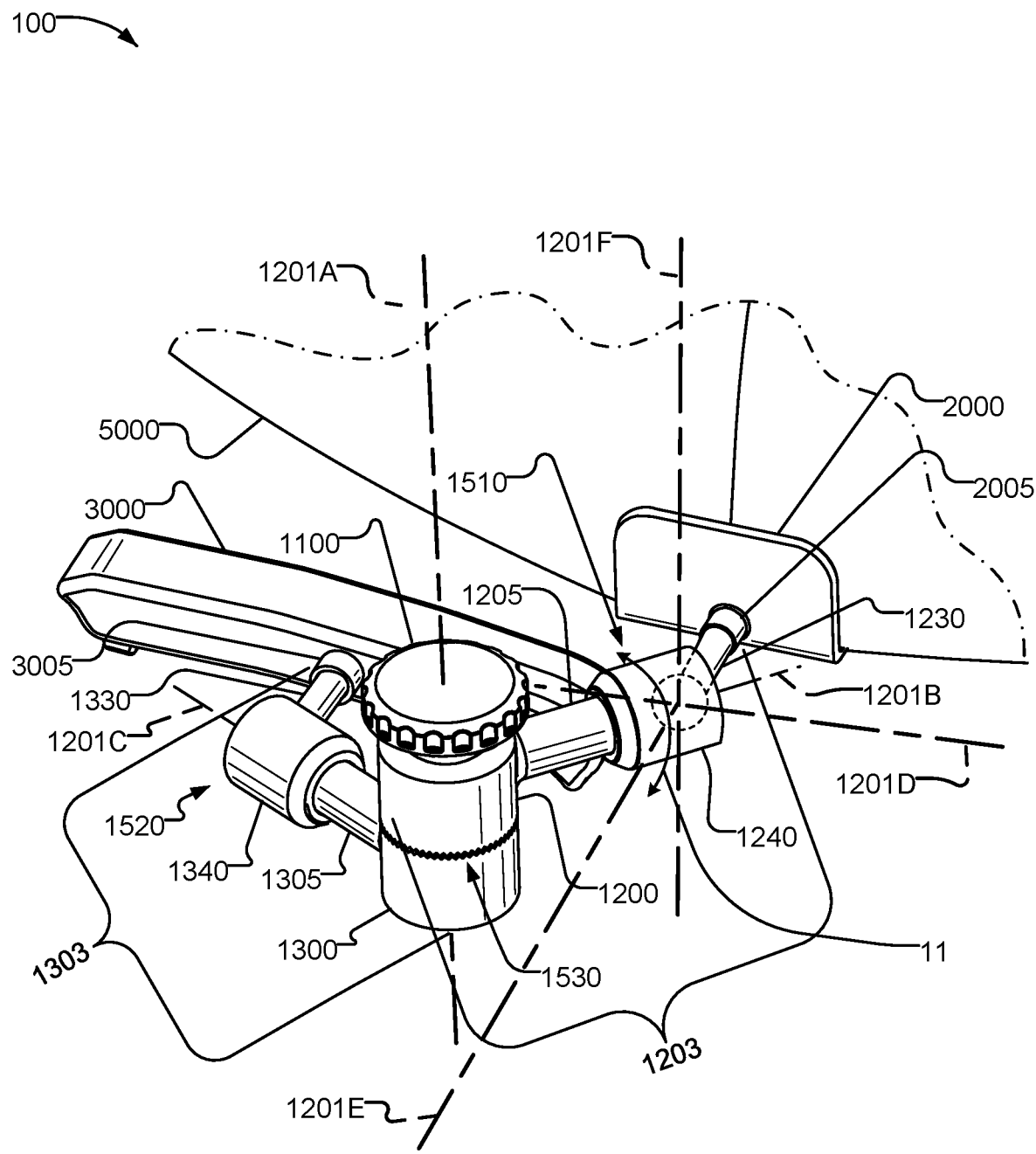
FIG. 6 is a top perspective view of an exemplary accessory connector as in FIG. 2, where the figure illustrates an upper end rod attached to a helmet accessory clip attached to a helmet and a lower end rod attached to an accessory bar with a locking actuator accessible by a user.

FIG. 6 is a top perspective view of an exemplary accessory connector 100, where the figure provides detail for the base alignment axis 1201A, the upper arm extension axis 1201B and degrees of freedom of movement of the upper rod end 1230 with respect to the upper arm extension axis 1201B. The same degrees of freedom of movement of the lower rod end 1330 with respect to the lower arm extension axis 1201C are provided by the accessory connector 100. Upper ball joint coordinate axes, 1201D, 1201E, 1201F, correspond with rotations of the upper ball joint 1510. The upper ball joint coordinate axes have a common origin at the center of the upper ball 1232. The upper ball joint axis 1201E extends along a longitudinal axis of the upper end rod 1230. Each of the upper ball joint axes 1201D and 1201F is orthogonal to the upper ball joint axis 1201E. Thus, the upper ball joint coordinate axes 1201D, 1201E, 1201F rotate about the common origin at the center of the upper ball 1232 and the upper arm extension axis 1201B rotates about the base axis 1201A.

During rotation of the upper end rod 1230, the upper ball joint axis 1201E continues to extend along the longitudinal axis of the upper end rod 1230 and the other two axes 1201D and 1201F remain orthogonal to the upper ball joint axis 1201E.

FIG. 7 is a top perspective view showing an exemplary accessory connector 100, where the figure provides detail for the base alignment axis 1201A, the lower arm extension axis 1201C and degrees of freedom of movement of the lower rod end 1330 with respect to the lower arm extension axis 1201C. Lower ball joint coordinate axes, 1201G, 1201H, 1201J, correspond with the lower ball joint 1520. The lower ball joint coordinate axes have a common origin at the center of the lower ball 1332. The lower ball joint axis 1201G extends along a longitudinal axis of the upper end rod 1230. Each of the lower ball joint axes 1201H and 1201J are orthogonal to the lower ball joint longitudinal axis 1201G. Thus, the lower ball joint coordinate axes 1201G, 1201H, 1201J rotate about the common origin at the center of the lower ball 1332 and the lower arm extension axis 1201C rotates about the base axis 1201A.

The upper and lower collars 1240, 1340 are each rotatable around the corresponding upper and lower arm extensions axes 1201B or 1201C. Specifically, the upper collar 1240 is rotatable 360 degrees around the upper arm extension axis 1201B, indicated by arrow reference 11, in FIG. 6, and the lower collar 1340 is rotatable 360 degrees around the lower arm extension axis 1201C, indicated by arrow reference 12, in FIG. 7. Additionally, the upper and lower balls 1232 and 1332 and the attached upper and lower end rods 1230, 1330 are also independently rotatable 360 degrees around corresponding end rod longitudinal axis 1201E or 1201G of the corresponding upper and lower end rods 1230, 1330 as indicated by arrow references 22 and 23 and 7-1, all shown in FIG. 7. Thus, each end rod is rotatable about its longitudinal ball axis 1201E or 1201G irrespective of the orientation of the longitudinal ball joint axis 1201E, 1201G with respect to the corresponding its corresponding extension arm axis 1201B, 1201C.

Referring to FIG. 7, the lower ball 1332 and the attached lower end rod 1330 rotate together. In an example, when the lower end rod is not engaged with the lower collar cutout 1342, the lower end rod longitudinal axis 1201G is substantially coaxial with the lower arm extension axis 1201C and the lower ball and attached lower end rod and the lower collar are independently rotatable about the lower arm extension axis 1201C with 360 degrees of rotation, e.g. as indicated by arrow reference 12 for the lower collar and by the arrow references 23 and 7-1 for the lower rod end 1334. To engage the lower end rod with the lower collar cutout 1342, the distal end of the lower end rod is rotated about the ball joint axis 1201J as indicated by the arrow reference 7-3. In this example, the lower end rod is rotated between about minus 10 degrees to about plus 100 degrees from the orientation where the lower end rod longitudinal axis 1201G is substantially coaxial with the lower arm extension axis 1201C.

In the example of FIG. 7, the lower end rod is rotated from a first orientation where the lower end rod longitudinal axis 1201G is substantially coaxial with the lower arm extension axis 1201C to the orientation where the lower end rod longitudinal axis is substantially coaxial with the ball joint axis 1201H. With the lower end rod 1334 still engaged with the lower collar cutout 1342, the lower collar 1340 and the lower end rod 1330 are rotatable about the lower arm extension axis 1201C over a 360-degree range. In an example, when the lower end rod longitudinal axis is aligned with the ball joint axis 1201H, as shown in FIG. 7, the lower end rod and attached lower ball and the lower collar 1340 are both rotated 90 degrees about the lower arm extension axis 1201C to align the lower end rod longitudinal axis with the ball joint axis 1201J.

Alternately, the same configuration can be achieved by rotating the lower end rod back to the orientation where the longitudinal axis of the lower end rod is coaxial with the lower arm extension axis 1201C and then rotating the lower collar 1340, by 90 degrees, about the lower arm extension axis 1201C to align the lower collar cutout 1342 with the ball joint axis 1201J, and then by rotating the distal end of the lower end rod 1330 about the ball joint axis 1201H, by 90 degrees, to where the longitudinal axis of the lower end rod 1330 is coaxial with the ball joint axis 1201J and the lower end rod is engaged with the lower collar cutout 1342. This rotation is indicated by the arrow reference 7-2. More broadly, the distal end 1334 of the lower end rod 1330 can be rotated and locked in place at any orientation indicated by the phantom hemispherical space 400 shown in FIG. 7. Similarly, this same freedom of end rod rotation with respect to the corresponding upper arm extension axis 1201B applies to the distal end of the upper end rod 1230 which can also be rotated and locked in place at any orientation indicated by a phantom hemispherical space associated with the distal end of the upper end rod 1230.

Returning to FIGS. 3A-C, FIGS. 3B and 3C illustrate different examples of locking interfaces of the hinge joint 1530 in FIG. 3A. FIG. 3B shows an interlocked teeth interface 1450 as the locking interface of the hinge joint 1530. In this embodiment, the interlocked teeth interface 1450 is formed between the upper base 1200 and the lower base 1300. In more detail, the interlocked teeth interface 1450 includes upper locking teeth 1452 disposed on a lower face 1470 of the upper base 1200 and lower locking teeth 1454 disposed on an upper face 1570 of the lower base 1300.

When the user 50 turns the locking actuator 1100 in a locking direction, the upper and lower bases 1200, 1300 are increasingly drawn toward each other until the upper locking teeth 1452 and the lower locking teeth 1454 engage. This engagement of the locking teeth prevents rotation of the upper and lower bases relative to each other around the base alignment axis 1201A.

FIG. 3C shows a friction gasket 1440 as the locking interface of the hinge joint 1530. In this embodiment, the friction gasket 1440 is disposed between the upper base 1200 and the lower base 1300. When the user 50 turns the locking actuator 1100 in a locking direction, the upper and lower bases 1200, 1300 are increasingly drawn toward each other. As a result, the lower face 1470 of the upper base 1200 contacts an upper surface of the friction gasket 1400 and exerts a downward force on the friction gasket 1400. Similarly, the upper face 1570 of the lower base 1300 contacts a bottom face of the friction gasket 1400 and exerts an upward force on the bottom face of the friction gasket 1400. The downward and upward forces are applied along the direction of the base alignment axis 1201A to the friction gasket 1400 and thus exert frictional forces upon the friction gasket 1400. These frictional forces prevent rotation of the upper and lower bases 1200, 1300 relative to each other around the base alignment axis 1201A.

FIGS. 4 and 5 are substantially similar side sectional views of the connector arm assembly 1000 in FIG. 3A, through the cross-section indicated by line A-A. These figures show a locked and an unlocked configuration of the connector arm assembly 1000, respectively. In these figures, proximal and distal relationships of components of the connector arm assembly 1000 are defined based on their distance from the base alignment axis 1201A. In one example, a component of the connector arm assembly 1000 may have two ends, where the end closest to the base alignment axis 1201A is the proximal end and the end furthest away from the base alignment axis 1201A is the distal end.

The paragraphs below provide more detail for the design of the connector arm assembly 1000 and a locking mechanism of the connector arm assembly 1000. The description for FIG. 4 describes the locking mechanism in detail and how it operates to lock the connector arm assembly 1000, while the description for FIG. 5 describes how the locking mechanism operates to unlock the connector arm assembly 1000.

Returning to FIGS. 4 and 5, the connector arm assembly 1000 includes various components that form the locking mechanism. These components include a threaded rod 1410, a locking actuator 1100, a hinge joint 1530, upper and lower lock wedges 1210, 1310, a thrust bearing 1420 and upper and lower lock rods 1220, 1320.

The connector arm assembly 1000 is also designed with various cavities that house many of the components of the locking mechanism and with features that enable the locking components to translate and rotate when the locking actuator is in an unlocked position and to become locked in place when the locking actuator is in a locked position. The upper body portion 1203 is formed with a substantially cylindrical upper body cavity 1204 passing therethrough, along a longitudinal axis of the upper body portion that is disposed substantially coincident with the base alignment axis 1201A. Specifically, the upper body cavity 1204 is formed within the upper base 1200. Similarly, the lower body portion 1303 is formed with a substantially cylindrical lower body cavity 1304 passing therethrough, along a longitudinal axis of the lower body portion that is also disposed substantially coincident with the base alignment axis 1201A. Specifically, the lower body cavity 1304 is formed within the lower base 1300.

A hinge sleeve 1430 is formed as a hollow cylindrical body having a cylindrical annular wall with a longitudinal axis disposed substantially coincident with the base alignment axis 1201A. The hinge sleeve 1430 is disposed within the upper body cavity 1204 and the lower body cavity 1304. The hinge sleeve extends between the upper and lower body cavities 1204, 1304 and is disposed to maintain alignment of the upper and lower bases 1200, 1300 along the base alignment axis 1201A. This arrangement of the hinge sleeve 1430 prevents radial translation between the bases 1200, 1300, e.g., as illustrated in FIGS. 4 and 5, and prevents relative translation between the bases in proximal and distal directions.

The upper and lower arm extensions 1205, 1305 are formed as hollow members, each having a substantially cylindrical arm extension cavity 1206, 1306 traversing a longitudinal length of their respective arm extensions 1205, 1305. The upper arm extension cavity 1206 traverses the upper arm extension 1205 from the upper body cavity 1204 to an open distal end of the upper arm extension 1205. A longitudinal axis of the cylindrical arm extension 1206 is coaxial with the upper arm extension axis 1201B. Similarly, the lower arm extension cavity 1306 traverses the lower arm extension 1305 from the lower body cavity 1304 to an open distal end of the upper arm extension 1305. A longitudinal axis of the cylindrical arm extension 1306 is coaxial with the lower arm extension axis 1201C.

The threaded rod 1410 has an upper end 1414 and a head 1412 and is disposed within the upper body cavity 1204 and the lower body cavity 1304. In more detail, the threaded rod is disposed within the cavities 1204, 1304 with a longitudinal axis of the threaded rod disposed substantially coincident with the base alignment axis 1201A. The upper end 1414 of the threaded rod 1410 extends upward from the upper base 1200.

The locking actuator 1100 is attached to the upper end 1414 of the threaded rod 1410. A retaining ring 1416 is attached to the threaded rod, proximate to its upper end 1414 to hold the locking actuator 1100 on the upper end 1414 of the threaded rod. Internal threads of the locking actuator 1100 engage with external threads of threaded rod 1410 at a threaded interface 1417 of the upper base 1200.

The upper lock wedge 1210 is disposed within the upper body cavity 1204 and the lower lock wedge 1310 is disposed within the lower body cavity 1304. Each lock wedge 1210, 1310 is formed as a hollow cylinder having an annular wall having an outer diameter and an inner diameter. The outer diameters of the lock wedges are sized to allow upward and downward travel of each lock wedge within the upper and lower body cavities 1204, 1304. The outer diameters also maintain sliding contact between an outer surface of each lock wedge and inner cylindrical faces 1207, 1307 of the upper and lower body cavities. In contrast, the inner diameters of the lock wedges 1210, 1310 are sized to allow upward and downward travel of the wedges relative to the threaded rod 1410. Specifically, the inner diameters of the wedges are larger than an outer diameter of the threads of the threaded rod 1410.

The upper and lower lock wedges 1210, 1310 include lock rod faces 1212, 1312. The lock rod faces 1212, 1312 are preferably formed as flat surfaces that extend from an outside diameter of each of the lock wedges 1210, 1310 and toward the center of each lock wedge. Each of the flat surfaces are preferably disposed at acute angles relative to a longitudinal axis of each lock wedge. In an exemplary embodiment, the flat surface of each lock rod face 1212, 1312 is disposed at a 45-degree angle relative to a longitudinal axis of its lock wedge 1210, 1310, which is coaxial with the base alignment axis 1201A. Furthermore, the upper lock wedge 1210 is disposed with its lock rod face 1212 facing downward, while the lower lock wedge 1310 is disposed with its lock rod face 1312 facing upward. The lower lock wedge 1310 also includes a threaded rod interface 1314 which is formed to allow mating contact between the threaded rod head 1412 and the lower lock wedge 1310.

The thrust bearing 1420 is disposed between the upper lock wedge 1210 and the locking actuator 1100 to transfer a compressive force therebetween. In some embodiments, the thrust bearing 1420 is a thrust bearing cassette comprising multiple ball bearings disposed in a cassette housing. In these embodiments, an upper surface of the upper lock wedge 1210 and a lower surface of the locking actuator 1100 are each formed with features for interfacing with the multiple ball bearings. These features are configured to allow rotation and translation of each of the multiple ball bearings relative to the upper and lower surfaces.

The upper arm extension 1205 includes the upper lock rod 1220 within the upper arm extension cavity 1206. The upper lock rod 1220 has a proximal end 1222 and a distal end, upper ball interface end 1224. The upper lock rod 1220 has a longitudinal axis that is substantially coincident with the upper arm extension axis 1201B. The upper lock rod 1220 is disposed along its longitudinal axis within the upper arm extension cavity 1206, towards the open distal end of the upper arm extension 1205.

The upper lock rod 1220 sits between the upper lock wedge 1210 and the upper ball 1232. In more detail, the proximal end 1222 of the upper lock rod 1220 is disposed against and designed to be in mating contact with the lock rod face 1212 of the upper lock wedge 1210. Preferably, a face of the proximal end 1222 is shaped with an acute angle relative to the longitudinal axis 1201B, e.g., at a 45-degree angle, to oppose the acute angle, e.g., the 45 degree angle of the lock rod face 1212. In contrast, the distal end 1224 of the upper lock rod 1220 is disposed against and is designed to be in mating contact with the upper ball 1232 in the locked configuration. For this purpose, the distal end 1224 has a face that is substantially concave in order to maximize contact with the surface of the upper ball 1232.

Similarly, the lower arm extension 1305 includes the lower lock rod 1320 within the lower arm extension cavity 1306. The lower lock rod 1320 has a proximal end 1322 and a distal end, lower ball interface end 1324. The lower lock rod 1320 has a longitudinal axis that is substantially coincident with the lower arm extension axis 1201C. The lower lock rod 1320 is disposed along its longitudinal axis within the lower arm extension cavity 1306, towards the open distal end of the lower arm extension 1305.

The lower lock rod 1320 sits between the lower lock wedge 1310 and the lower ball 1332. In more detail, the proximal end 1322 of the lower lock rod 1330 is disposed against and is designed to be in mating contact with the lock rod face 1312 of the lower lock wedge 1310. Preferably, a face of the proximal end 1322 is shaped with an acute angle relative to the longitudinal axis 1201C, e.g., at a 45-degree angle, to oppose the acute angle, e.g. the 45 degree angle of the lock rod face 1312. In contrast, the distal end 1324 is disposed against and is designed to be in mating contact with the lower ball 1332 of the lower end rod 1330. For this purpose, the distal end 1324 has a face that is substantially concave in order to maximize contact with the surface of the lower ball 1332.

The upper and lower ball joints 1510, 1520 include various retaining clips that assist in the operation of the locking mechanism. Upper and lower ball retaining clips 1254, 1354 aid in retention of the upper and lower ball 1232, 1332 within the upper and lower collar chambers 1246, 1346, respectively. Upper and lower collar retaining clips 1252, 1352 aid in preventing each collar from being disengaged from the distal end of the upper and lower arm extensions 1205, 1305 and limit distal travel of the upper and lower collars 1240, 1340. The upper and lower balls 1232, 1332, together with the upper and lower ball retaining clips 1254, 1354, limit proximal travel of the upper and lower collars 1240, 1340.

Locking and Unlocking of Connector Arm Assembly

In FIG. 4, when the user 50 turns the locking actuator 1100 in the locking direction, indicated by an arrow with reference 41, internal threads of the locking actuator 1100 engage with the external threads of the threaded rod 1410 at the threaded interface 1417. As a result, the threaded rod is drawn upwards along the base alignment axis 1201A.

At the same time, a lower face of the locking actuator 1100 contacts an upper face of the thrust bearing 1420. A lower face of the thrust bearing also contacts an upper face of the upper lock wedge 1210. The locking actuator 1100 exerts a downward force against the upper face of the thrust bearing 1420, and the lower face of the thrust bearing 1420 exerts a downward force against the upper face of the upper lock wedge 1210. As a result, the upper lock wedge 1210 is vertically translated downwards along the base alignment axis 1201A.

Also, as the threaded rod 1410 is drawn upwards, the threaded rod interface 1314 of the lower lock wedge 1310 engages the head 1412 of the threaded rod 1410. This moves the lower lock wedge 1310 so that it is vertically translated upwards along the base alignment axis 1201A.

In response to the turning of the actuator 1100 in the locking direction 41, the resulting vertical translation of the lock wedges 1210, 1310 towards one another causes the components of the connector arm assembly 1000 to be locked into their current position and orientation. Specifically, the upper ball joint 1510, the lower ball joint 1520, and the hinge joint 1530 are each locked into their current position and orientation and prevented from further movement in response to turning the actuator 1100. More detail for the locking of these components is included herein below.

The locking of the upper ball joint 1510 is accomplished as follows. The lock rod face 1212 of the upper lock wedge 1210 engages the upper lock rod 1220 at its proximal end 1222 and moves the upper lock rod 1220 towards the upper ball 1232 along the upper arm extension axis 1201B. Translation of the upper lock rod along the upper arm extension axis 1201B is initiated by contact between the upper lock rod face 1212 and the proximal end 1222. These two surfaces are formed at acute angles which form a wedge that transfers downward motion of the upper lock wedge 1210 into substantially perpendicular motion of the upper lock rod toward the upper ball 1232.

In response, the distal end 1224 of the upper lock rod 1220 engages the upper ball 1232 and drives the upper ball 1232 against the upper ball retaining clips 1254 within the upper collar 1240 with a force that inhibits movement of the ball 1232 and the upper end rod 1230. Additionally, the force of the upper ball 1232 against the upper ball retaining clip 1245 forces the upper collar 1240 against the upper ball retaining clip 1252 with a force of an inside surface of the collar annular wall 1240 against the upper ball retaining clip 1252 that inhibits further translation or rotation of the upper collar 1240. As a result, the upper ball 1232, the upper end rod 1230, and the upper collar 1240 are each fixed in position and degree of rotation with respect to the upper arm extension 1205.

The locking of the lower ball joint 1520 is accomplished as follows. The lock rod face 1312 of the lower lock wedge 1310 engages the lower lock rod 1320 at its proximal end 1322 and moves the lower lock rod 1320 towards the lower ball 1332 along the lower arm extension axis 1201C. Translation of the lower lock rod along the lower arm extension axis 1201C is initiated by contact between the lower lock rod face 1312 and the proximal end 1322. These two surfaces are formed at acute angles which form a wedge that transfers upward motion of the lower lock wedge 1310 into substantially perpendicular motion of the lower lock rod toward the lower ball 1332.

In response, the distal end 1324 of the lower lock rod 1320 engages the lower ball 1332 and drives the lower ball 1332 against the lower ball retaining clips 1354 within the lower collar 1240 with a force that inhibits movement of the ball 1332 and the lower end rod 1330. Additionally, the force of the lower ball 1332 against the lower ball retaining clip 1345 forces the lower collar 1340 against the lower ball retaining clip 1352 with a force of an inside surface of the lower collar annular wall 1340 against the lower ball retaining clip 1352 that inhibits further translation or rotation of the lower collar 1340. As a result, the lower ball 1332 and the lower collar 1340 and the lower end rod 1330 are each fixed in position and degree of rotation with respect to the lower arm extension 1305.

The locking of the hinge joint 1530 is accomplished as follows. During the process of locking, each wedge face 1212, 1312 of the upper and lower wedges 1210, 1310 exerts a radial force (i.e. force along the upper and lower arm extension axes 1201B, 1201C). These radial forces are exerted against corresponding faces of the proximal ends 1222, 1322 of the upper and lower lock rods 1230, 1330. In response, the lock rods 1230, 1330 exert reactive forces against the upper and lower wedges 1210, 1310. These reactive forces drive the outer surfaces of the lock wedges against the corresponding inner cylindrical faces 1207, 1307 of the upper and lower body portions 1203, 1303, thereby generating frictional forces therebetween.

The frictional forces thus generated between the upper lock wedge 1210 and the upper body portion 1203 lock them in mating contact. This substantially prevents sliding motion of the upper lock wedge 1210 relative to the upper body portion 1203 along the base alignment axis 1201A. The lower lock wedge 1310 and the lower body portion 1303 are similarly locked together by the reactive forces. Thus, the upper base 1200 and the lower base 1300 are drawn toward each other along the base alignment axis 1201A, causing the hinge joint 1530 to close, e.g. as the upper and lower bases are drawn together and to engage the toothed interface 1450 or to increase contact forces against the frictional interface 1440 to thereby prevent further translation or rotation of the upper body portion with respect to the lower body portion.

As a result, the locking mechanism locks the bases 1200, 1300 to prevent rotation of the upper and lower body portions 1203, 1303 relative to one another, around the base alignment axis 1201A, as well as to prevent rotation of the upper and lower arm extensions 1205, 1305 around the base alignment axis 1201A. At the same time, the lock wedges 1210, 1310 acting against the lock rods 1220, 1320 lock the upper and lower ball joints 1510, 1520 with respect to the upper and lower arm extensions 1205, 1305, thereby preventing translation and rotation of each of the upper and lower collar 1240, 1340, the upper and lower ball 1232, 1332 and the upper and lower end rods 1230, 1330.

Because the helmet attachment clip 2000 is attached to the helmet 5000 and to the distal end 1234 of the upper end rod 1230, the distal end 1234 is fixed in position and rotation with respect to the helmet 5000. In addition, because the accessory attachment bar 3000 attaches to the distal end 1334 of the lower end rod 1330, the distal end 1334 is fixed in position and rotation with respect to the accessory attachment bar 3000 (and thus an accessory 4000 attached to the accessory attachment bar 3000) is fixed in position and rotation with respect to the distal end 1234. As a result, only elements of the accessory connector 100 are movable with respect to the upper end rod distal end 1234 and the lower end rod distal end 1234 to change the position and orientation of the accessory 4000.

FIG. 5 is substantially similar to FIG. 4 but illustrates operation of the connector arm assembly 1000 when the user 50 turns the locking actuator 1100 in an unlocking direction. The unlocking direction is indicated by an arrow with reference 42.

Various actions upon the components of the connector arm assembly 1000 in response to the unlocking 42 are as follows. The threaded rod 1410 is drawn downward. As a result, wedge forces between the lock wedges 1210, 1310 and corresponding lock rods 1220, 1320 are reduced or eliminated, thereby releasing the upper and lower end rods 1230, 1330 from their locked configurations. The frictional locking forces between the lock wedges 1210, 1310 and the inner cylindrical faces 1207, 1307 of the upper and lower body portions 1203, 1303 are also reduced or eliminated. This releases the rotational locking between the upper and lower bases 1200, 1300 at the hinge joint 1530 so that the toothed interface 1450 or friction gasket 1440 interface are disengaged. In addition, the upper and lower lock rods 1220, 1320 no longer impinge upon the upper and lower balls 1232, 1332 of the upper and lower end rods 1230, 1330/upper and lower ball joints 1510, 1520. As further described below, the locking elements provide a frictionally seated state wherein the user can partially lock the accessory connector 100, by applying less than a full locking force, by fine adjustment of the rotation of the locking actuator 1100. In the frictionally seated state, elements of the accessory connector are prevented from translation, or rotation, by frictional seating.

However, the frictional seating force can be overcome by the user to make fine adjustments, e.g. by using one hand to move the accessory (rotation and/or translation) to a desired operating position. Since the elements are frictionally seated, when the user releases the accessory it remains in the selected location. The user may repeatedly move the accessory while the accessory connector elements are frictionally seated to eventually find a suitable operating position. Finally, when the suitable operating position is found, the user fully locks the accessory connector elements by further rotation of locking actuator 1100 to the final locking position which frictionally seats the components with a frictional force that cannot be overcome by the user. In a desirable operating mod, the user, using one hand, finely adjusts the locking actuator 1100 to slightly unlock the accessory arm to achieve frictional seating that allows the user finely adjust the position and/or orientation accessory attachment bar 3000, using the other hand, while viewing the accessory display screen 4020.

Rotation and Degrees of Freedom at Joints of Exemplary Connector Arm Assembly

Figure 8:
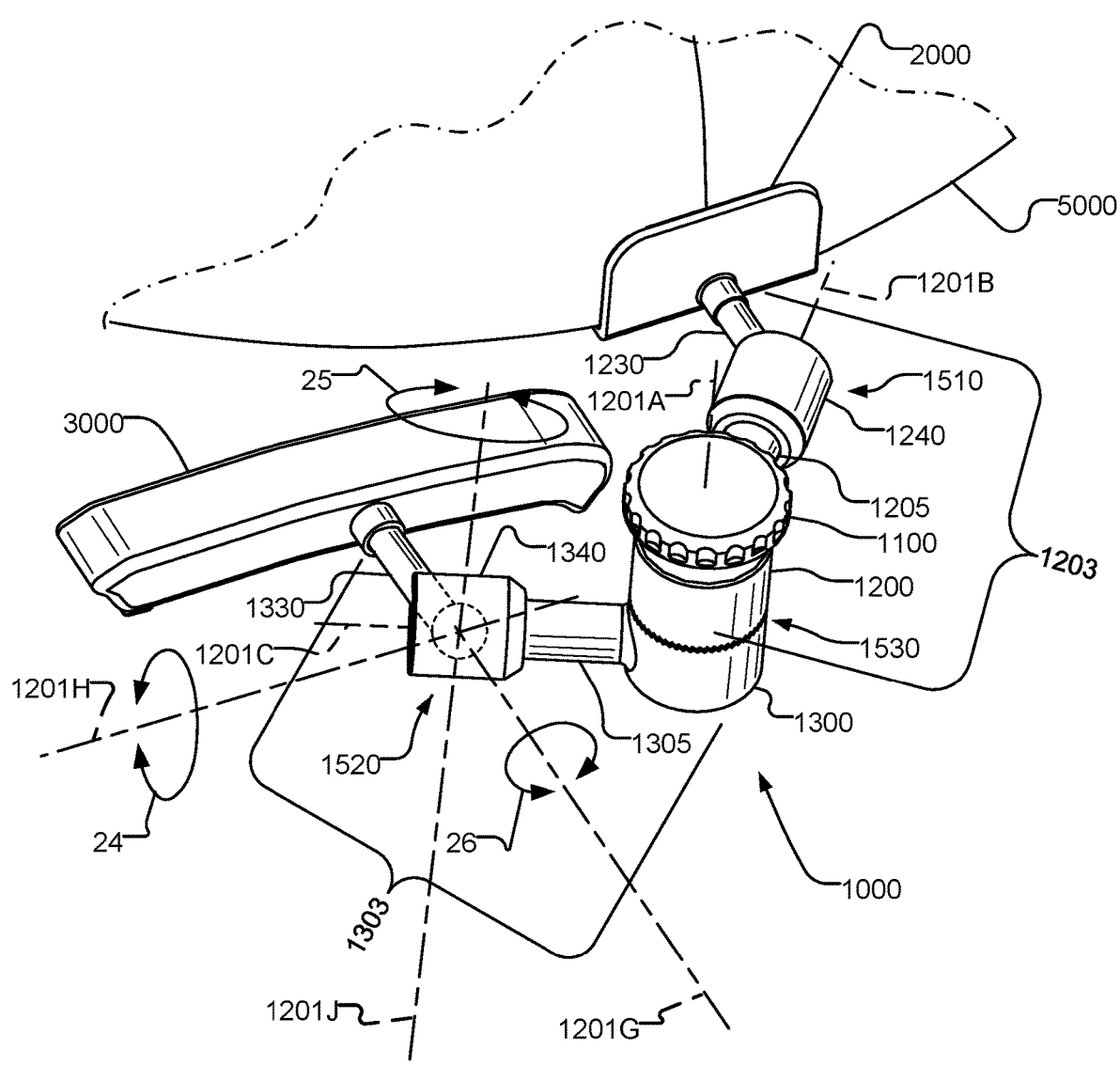
FIG. 8 is a top perspective view of an exemplary accessory connector as in FIG. 2, where the figure illustrates some degrees of freedom of movement of an accessory attachment bar with respect to the accessory connector.

FIGS. 6, 7, and 8 depict different location and orientation adjustments of the connector arm assembly 1000 that may be performed when the connector arm assembly 1000 is in an unlocked configuration.

FIG. 6 is a top perspective view of an exemplary accessory connector 100 mounted to a helmet 5000 by a helmet attachment clip 2000. In the present non-limiting exemplary embodiment, the helmet attachment clip 2000 includes an attachment sleeve 2005 fixedly attached to the helmet attachment clip 2000, e.g. by brazing, adhesive bonding, mechanical fasteners; or the attachment sleeve 2005 is integrally formed with the helmet attachment clip 2000 or with the helmet 5000. The attachment sleeve 2005 is sized to receive the distal end of the upper end rod 1230 therein, and the distal end of the upper end rod 1230 is fixedly attached to the attachment sleeve 2005, e.g. by brazing, adhesive bonding, a mechanical fastener, or the like. The helmet attachment clip 2000 is fixedly attached to the helmet e.g. by adhesive bonding, mechanical fasteners, or the helmet attachment clip 2000 and the attachment sleeve 2005 are integrally formed with the helmet.

The accessory bar 3000 includes an attachment sleeve 3005, fixedly attached to the accessory bar, e.g. by brazing, adhesive bonding, mechanical fasteners, or the attachment sleeve 3005 is integrally formed with the accessory bar 3000. The attachment sleeve 3005 is sized to receive the distal end of the lower end rod 1330 therein and the distal end of the lower end rod 1330 is fixedly attached to the attachment sleeve 3005 e.g. by brazing, adhesive bonding, a mechanical fastener, or the like.

The configuration and orientation of the connector arm assembly 100 shown in FIG. 6 approximately represents an orientation of the connector arm that a user might select to place an accessory 4000, attached to the accessory attachment bar 3000, in an operating position as described above. The distal end of the upper end rod 1230 is fixedly attached to the helmet attachment clip 2000 via the attachment sleeve 2005. The distal end of the lower end rod 1330 is fixedly attached to the accessory bar 3000 via the attachment sleeve 3005. The accessory 4000, shown in FIG. 1, can be attached to, or detached from, the accessory bar 3000 by the user. An alternate configuration of the connector arm assembly can be reversed wherein the distal end of the upper end rod 1230 is fixedly attached to the accessory bar 3000 via the attachment sleeve 3005 and the lower end rod 1330 is fixedly attached to the helmet attachment clip 2000 via the attachment sleeve 2005; however, the alternate configuration causes the locking actuator 1100 to face downward instead of upward which may be undesirable for some users.

In the configuration shown in FIG. 6, the accessory bar 3000 is positioned above the user's right eye so that when the accessory 4000 is attached to the accessory bar 3000 the accessory is in the field of view of the right eye of the user and when the accessory 4000 is detached from the accessory bar 3000 the accessory bar 3000 is not in the field of view of the right eye of the user. In the configuration shown in FIG. 1, the locking actuator 1100 is positioned above the accessory bar 3000 and above each of the bases 1200 and 1300 with the base alignment axis 1201A substantially vertically oriented so that the user can easily grasp the locking actuator 1100 with one hand without being able to see the locking actuator 1100.

FIG. 7 illustrates rotational adjustability of the accessory connector 100 as a unit, relative to the helmet 5000, or relative to the helmet attachment clip 2000. Neither the accessory attachment bar 3000, nor an accessory 4000, are shown in FIG. 7 for clarity. However, in an operating mode, the accessory bar 3000 is fixedly attached to the distal end of the lower end rod 1330 and the accessory 4000 is attached to the accessory bar 3000. The upper base 1200 and the lower base 1300 have three degrees of freedom of motion. Each base is independently rotatable about the base alignment axis 1201A, with a 360° range of rotation. These rotations relate to first and second rotational degrees of movement.

Each base can translate along the base alignment axis 1201A, e.g. when the accessory connector 100 is in the unlocked configuration, the upper and lower bases are translated along the base alignment axis to separate the upper base from the lower base in order to disengage the tooth interface 1450 or to separate the bases from the friction gasket 1440 at the hinge joint 1530. This translation provides a third degree of movement. Rotation of the upper base 1200 about the base alignment axis 1201A also rotates the upper extension arm 1205 and the upper ball joint 1510 about the base alignment axis 1201A with a 360° range of rotation. Rotation of the lower base 1300 about the base alignment axis 1201A also rotates the lower extension arm 1305 and the lower ball joint 1520 about the base alignment axis 1201A with a 360° range of rotation.

Lower ball joint 1520 is shown with lower ball joint coordinate axes 2004. The lower ball joint coordinate axes 2004 have an origin at the center of the lower ball 1332, which is spherical. The lower ball joint coordinate axes 2004 illustrates rotations of the lower ball joint with respect to the lower arm extension axis 1201C. As shown the lower ball joint coordinate axes include axis 1201G, which extends along the longitudinal axis of the lower end rod 1330, and lower ball joint axes 1201D and 1201E which are mutually orthogonal and both orthogonal with respect to axis 1201D. The upper ball joint coordinate axes, shown in FIG. 6, illustrate rotations of the upper ball joint with respect to the upper arm extension axis 1201B. The upper ball joint coordinate axes include axis 1201E, which extends along the longitudinal axis of the upper end rod 1230 and two upper ball joint axes 1201D and 1201F which are mutually orthogonal and both orthogonal with respect to axis 1201E.

The upper ball joint 1510 and the lower ball joint 1520 each have three rotational degrees of freedom. Referring to the lower ball joint 1520 and the ball joint coordinate axes 2004 shown in FIG. 7, a first rotational degree of freedom allows rotational adjustment of the lower ball and attached lower end rod 1330 about the lower arm extension axis 1201C illustrated by the arrow reference 23. A corresponding upper ball joint rotation is about the upper arm extension axis 1201B, shown in FIG. 6. The first degree of rotational freedom of the lower ball joint also includes rotation of the upper lower collar 1340, is illustrated in FIG. 7, which is independently rotatable about the upper arm extension axis 1201B as indicated by the rotation arrow 12. With the accessory connector 100 in the unlocked configuration, the lower collar 1340 is rotatable about the distal end of the lower arm extension 1305. Rotation of the lower collar 1340 allows a user to orient the lower cutout 1342 to a desired operating position. The lower collar 1340 can be rotated about the lower arm extension axis 1201C when the lower end rod 1330 is engaged with the lower cutout 1342 or when the lower end rod 1330 is not engaged with the lower cutout, e.g. when a longitudinal axis of lower end rod is substantially coaxial with the lower arm extension axis 1201C.

A second rotational degree of freedom of the lower ball joint 1520 allows rotational adjustment of the lower ball 1332 and the lower end rod 1330 about the ball joint axis 1201H, or ball joint rotational axis 1201J, to engage the lower end rod with the lower cutout 1342. This rotation is shown by the rotation arrow reference 7-2 and 7-3. In this example, the lower end rod 1330, is rotated from a position where the longitudinal axis of the lower end rod 1330 is coaxial with the lower arm extension 1305 about the ball joint axis 1201J to engage the lower end rod 1330 with the lower cutout 1342 as shown by the sold lined lower end rod in FIG. 7. In this example both a center of the lower cutout and a longitudinal axis of the lower end rod are coaxial with the ball joint axis 1201H. The second rotational degree of freedom of the lower ball joint 1520 has an angular range of minus 10 to plus 100 degrees, e.g., between the lower arm extension axis 1201C and the ball joint axis 1201H. However, the second rotational degree of freedom can have an angular range of 180° or more e.g., when the lower collar cutout 1342 is rotated 180° to engage with the lower end rod 1330 along the ball joint axis 1201H but in the opposite direction as indicated by the dashed outline of the lower end rod 1330'.

A third rotational degree of freedom of the lower ball joint 1520 allows rotational adjustment of the lower ball 1332 and the lower end rod 1330 about the ball joint axis 1201G which extends along the longitudinal axis of the lower end rod. This rotation of the lower end rod is shown by the rotation arrow 7-1. In this example, the lower end rod 1330, shown by solid lines, is rotated about the lower arm extension axis 1201G. This third rotational degree of freedom is used to rotate the accessory attachment bar 3000 with respect to the lower ball joint 1520. The third rotational degree of freedom of the lower ball joint 1520 has an angular range of 360°. The upper ball joint 1510 has the same rotational degrees of freedom as the lower ball joint 1520.

As best shown in FIG. 4, when the connector arm assembly 1000 is in its unlocked configuration, the user 50 can adjust the level of locking such that the positions of the components of the connector arm assembly 1000 are relatively persistent through adjustments. In one example, during the locking process, lock wedges 1210, 1310 are gradually advanced toward the locked configuration without fully locking the connector arm assembly. In the case of the ball joints 1510, 1520, translation of the upper and lower lock rods 1220, 1320 eventually cause the distal ends 1224, 1324 thereof to contact the upper and lower balls 1232, 1332 and further translation of the lock rods along corresponding upper and lower arm extension axes 1201B and 1201C to thereby force each ball into mating contact with an upper or lower ball retaining ring 1254, 1354. Additionally, the further translation of the lock rods forces the upper and lower collars 1240, 1340 into mating contact with the upper and lower collar retaining clips 1252, 1352. Eventually the collars and the balls become frictionally seated within the corresponding ball joint chamber 1246, 1346. Once fictionally seated, the user is able to make fine adjustments for the position and orientation of the accessory 4000, e.g. by overcoming the frictional seating force, and the user can then release the accessory 4000 with reassurance that the frictional seating force will hold the accessory in the selected position and orientation of the accessory 4000. Preferably the user can make and evaluate several fine adjustments before fully locking the connector arm assembly to prevent further adjustment of the position and orientation of the accessory 4000. As described herein, the user positions the accessory 4000 while wearing the helmet 5000 with the connector arm assembly 1000 fixedly attached to the helmet by the helmet attachment clip 2000 and with the accessory 4000 attached to the accessory attachment bar 3000.

FIG. 8 illustrates that rotational adjustability of the accessory attachment lower ball joint 1520. The accessory 4000 is not shown for clarity. In particular, the lower ball joint 1520 includes the ball joint coordinate axes 2004 with orthogonal axes 1201G, 1201H, 1201J. A longitudinal axis of the lower end rod 1330 is coaxial with the ball joint axis 1201G. The lower end rod is partially engaged with the lower cutout of lower collar 1340. A user holding the accessory attachment bar 3000, or the accessory, can rotate the accessory attachment bar 3000 about the ball joint axis 1201G as indicated by the direction arrow 26 to rotate the accessory as needed to adjust the orientation of an accessory attached to the accessory bar 3000.

The user holding the accessory attachment bar 3000, or the accessory, can further rotate the accessory attachment bar about the ball joint axis 1201J as indicated by the direction arrow 25 to further adjust the orientation of the accessory attached to the accessory bar 3000 by providing more or less engagement of the lower end rod with the lower cutout of lower collar 1340. The user holding the accessory attachment bar 3000, or the accessory, can further rotate the lower end rod and accessory attachment bar about the ball joint axis 1201H as indicated by the direction arrow 24 to rotate the lower end rod and the lower collar to adjust the position and orientation of the accessory attached to the accessory bar 3000 as needed.

Figure 9:
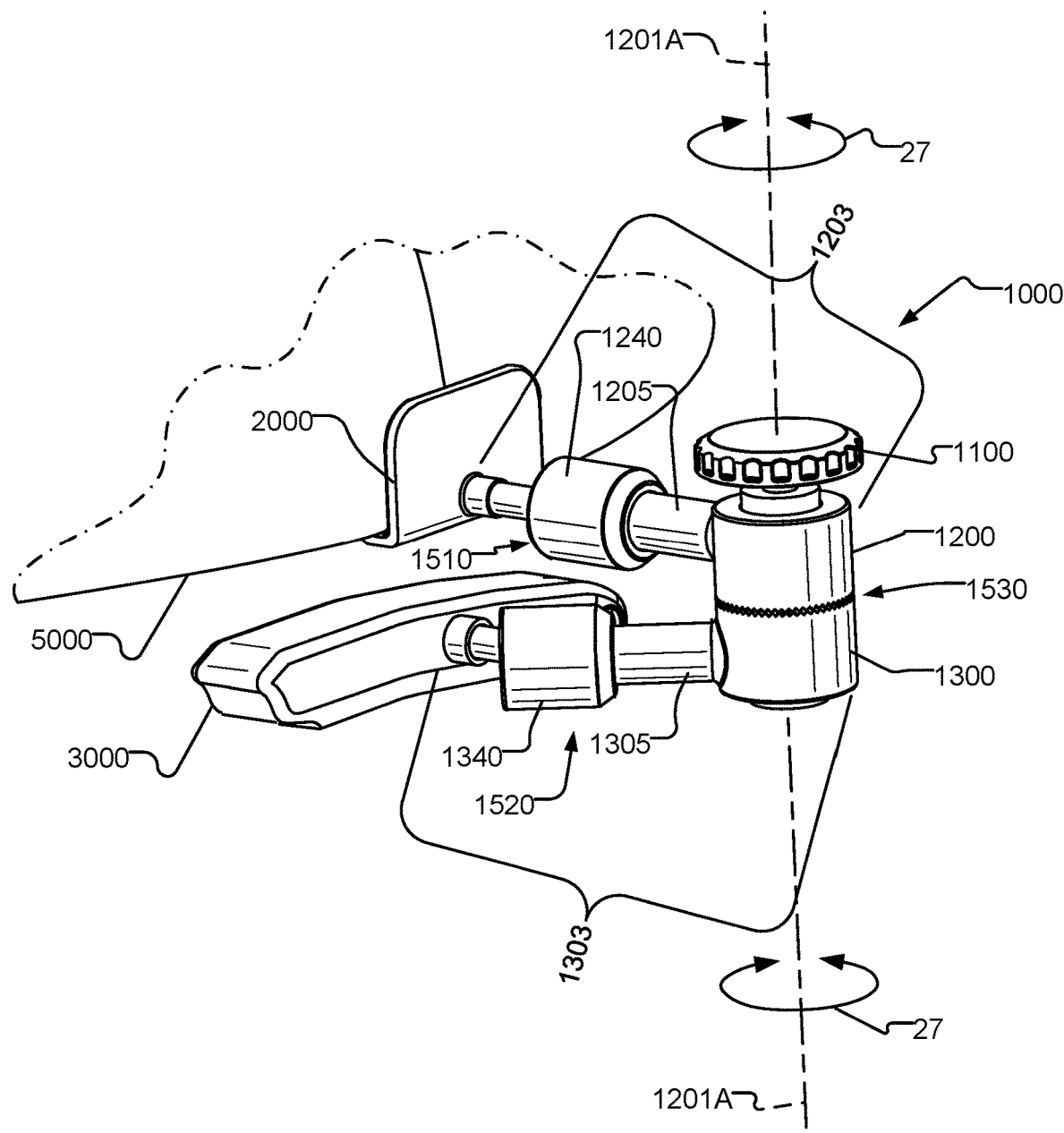
FIG. 9 is a side perspective view of an exemplary accessory connector as in FIG. 2, where the figure illustrates rotation of the connector arm assembly around a hinge joint disposed between the bases.

FIG. 9 illustrates rotational adjustability provided by the hinge joint 1530. In particular, the hinge joint provides two rotational degrees of freedom, indicated by the arrows 27 where one arrow 27 illustrates rotation of the upper base 1200 and the other arrow 27 illustrates rotation of the lower base 1300 relative to the base alignment axis 1201A. Accordingly, through an appropriate combination of rotations of the upper and lower ball joints 1510, 1520 and of each of the upper and lower base 1200, 1300 the user 50 may move the accessory attachment bar 3000 and an accessory 4000 attached thereto into a desired position and angular orientation relative to the helmet 5000 and/or to the user's eye. As noted above, the distal end of the upper end rod is fixedly attached to helmet attachment clip 2000 via the attachment sleeve 2005 and the distal end of the lower end rod is fixedly attached to the accessory bar 3000 via the attachment sleeve 3005 such that only the degrees of freedom of motion provided by the accessory connector 100 are used to adjust the position of the accessor attached to the accessory attachment bar 3000.

Exemplary Helmet-Mounted HUD System

Figure 10:
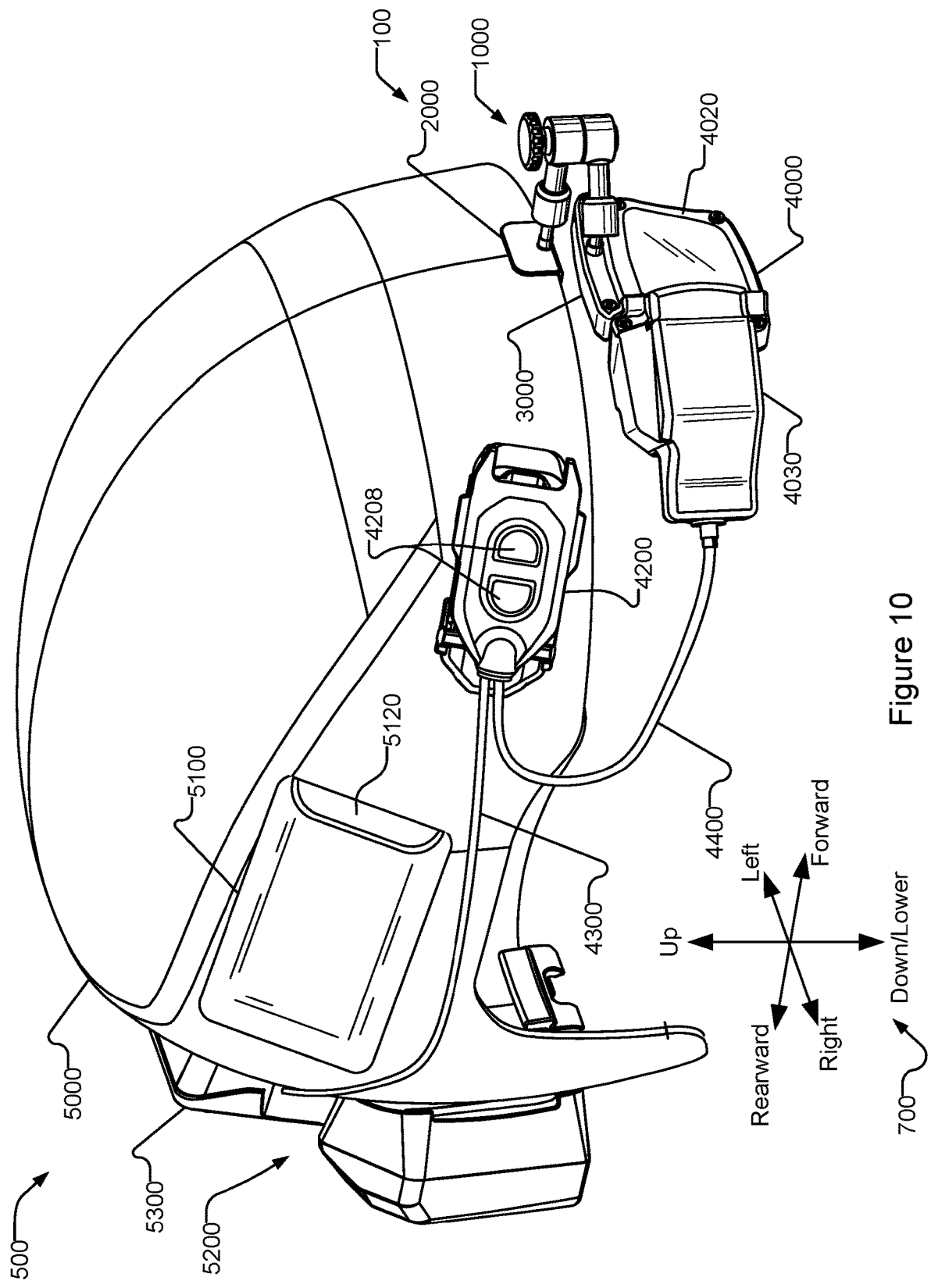
FIG. 10 is a side perspective view of an exemplary helmet-mounted HUD system (HUD system) that includes an accessory connector attached to a helmet and a HUD device accessory attached to the accessory connector.

FIG. 10 illustrates a helmet-mounted HUD system (HUD system) 500 worn by a user 50.

The HUD system 500 has various components. These components include a helmet 5000 and a helmet attachment clip 2000, a HUD device accessory 4000, an accessory connector 100 with an accessory attachment bar 3000 for supporting the transparent display 4020 in an operating position and a helmet electronic controller 5200. Additional components include a stow pouch 5100, a HUD user interface 4200 first and second HUD cables 4300, 4400 and a power source 5300, e.g., a rechargeable battery.

The HUD device accessory 4000 includes the transparent display 4020 and an image rendering element 4030. While a HUD device is shown as the accessory 4000, other optical device embodiments are possible. In another embodiment, the accessory 4000 is an image enhancement device, in examples a night vision device or image magnification device.

The stow pouch 5100 is provided to store the accessory 4000 when it is not being used. The stow pouch is made of a durable material and includes a front flap 5120. The front flap 5120 includes a closure that enables the accessory 4000 to be securely held within the pouch 5100. The closure can be held closed by a magnetic force, e.g. by opposing magnets or a single magnet attracted to a magnetic material, by a hook and loop material fastener, or by various mechanical fasteners. In one example, the material of the pouch 5100 is cloth, canvas, or other fabric-based material. In another example, the material is formed from a unitary plastic material or from fibers that resists tearing. In yet other examples, the pouch is formed from leather, pleather, or other durable synthetic material. Preferably, the pouch 5100 and front flap 5120 and the closure elements provide a weatherproof enclosure for securely storing and protecting the HUD.

The HUD user interface 4200 includes one or more actuators, e.g. buttons 4208 that the user 50 selects to control the HUD device accessory 4000 and/or the helmet electronic controller 5200. The user 50 presses the buttons 4208 to actuate one or more actuators operable to trigger a control sequence, e.g., a start, stop switch to connect the HUD device accessory 4000 to the power source 5300 and to the helmet electronic controller 5200 and disconnect the HUD device accessory 4000 when it is not in use. The one or more actuators operable to trigger a control sequence are also operable by the user to change an operating mode of the HUD device accessory, e.g. to change its brightness, screen resolution, to select a menu for display or to select items listed on a menu displayed on the transparent display 4020 or otherwise modify data and/or commands presented at the display screen 4020. In one example, the user 50 presses the buttons to select one or more HUD device profiles for formatting and presenting the data upon the display screen 4020.

The components of the HUD system 500 are arranged as follows. The accessory connector 100 is mounted to the front of the helmet 5000 via the helmet attachment clip 2000. The HUD device accessory 4000 attaches to the accessory connector bar 3000. The stow pouch 5100 and the HUD user interface 4200 both attach to an external surface of the helmet 5000, preferably on the side nearest to the accessory 4000 to make the user interface easily accessible to the user. The helmet electronic controller 5200 mounts to an external surface of the helmet 5000, typically near the back of the helmet 5000 as shown. The HUD user interface 4200 connects to the helmet electronic controller 5200 via the first HUD cable 4300 and connects to the HUD device accessory 4000 via the second HUD cable 4400. The opposing back and front arrangement of the helmet electronic controller 5200, the power source 5300 and the HUD device accessory 4000 and accessory connector 100 on the helmet 5000 are configured to balance the weight that these objects place upon the helmet 5000.

The user 50 can remove the accessory 4000 from the accessory attachment bar 3000 and place the accessory in the stow pouch 5100 for safe keeping and future reattachment. Because the stow pouch 5100 is preferably located on a side of the helmet 5000 nearest the accessory 4000, the user 50 can typically store the accessory 4000 in the stow pouch 5100 and remove it from the stow pouch 5100 using one hand.

The first and second HUD cables 4300, 4400 enable communications between the accessory 4000, the HUD user interface 4200 and the helmet electronic controller 5200. The helmet electronic controller 5200 sends data and commands via the second HUD cable, and the HUD user interface 4200 forwards the data and commands to the image rendering element 4030 of the accessory 4000 for display by the transparent display screen 4020. When the user 50 selects a command presented at the display screen 4020 via the buttons 4208, the HUD user interface 4200 receives the user selection and forwards the selection to the helmet electronic controller 5200 via the second HUD cable 4300 for further processing. The helmet electronic controller 5200 processes the user command and executes the command, e.g. by sending new image frames to the image rendering element 4030 over the first and second HUD cables 4300, 4400.

Figure 11:
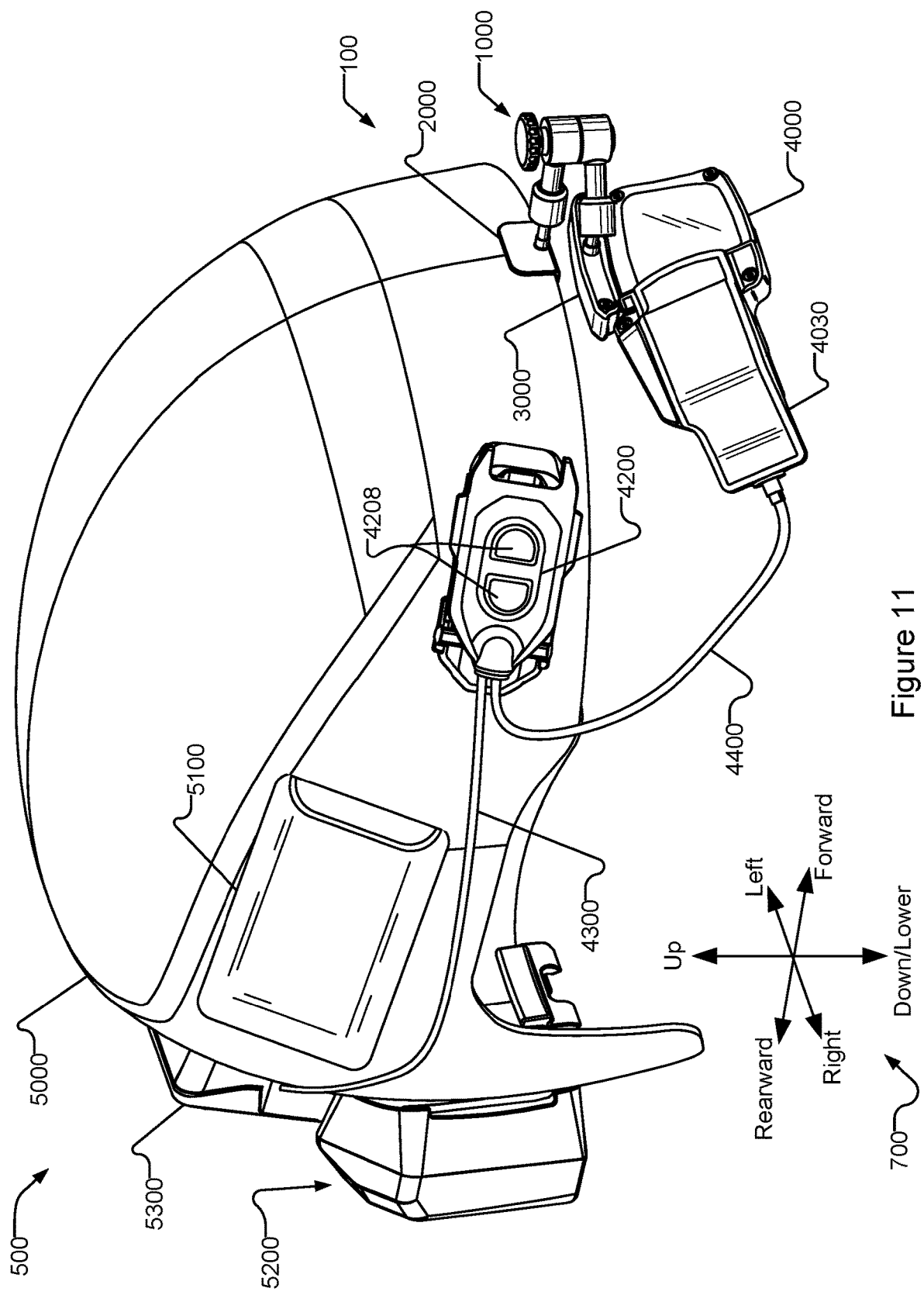
FIG. 11 is a side perspective view of a HUD system as in FIG. 11, where the figure shows how the user removes the HUD device accessory from the accessory attachment bar of the accessory connector.
Figure 12:
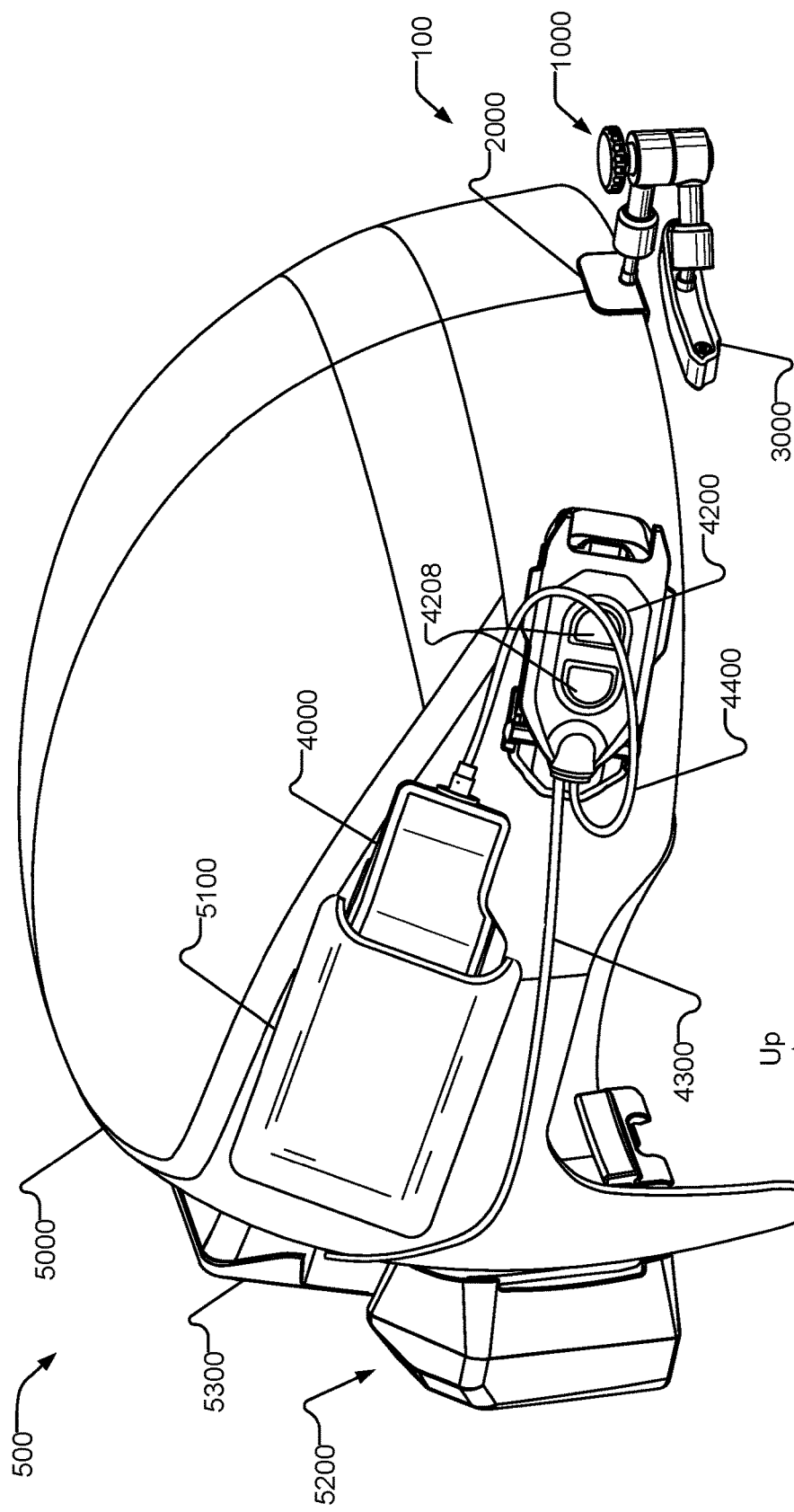
FIG. 12 is a side perspective view of a HUD system as in FIG. 11, where the figure shows how the user can store a removed HUD device accessory in a stow pouch of the helmet.

Exemplary Attachment, Alignment, and Reattachment of Accessory Relative to the Accessory Attachment Bar in the HUD System FIGS. 11 and 12 respectively illustrate removal of the HUD device accessory 4000 from the accessory connector bar 3000 and stowage of the accessory in the stow pouch 5100.

In FIG. 11, the accessory is attached to the attachment bar 3000 in an operating position and the connector arm assembly is in the locked configuration. The user 50 removes the accessory 4000 from the accessory attachment bar 3000 by rotating a bottom edge of the accessory 4000 forward and upward relative to the accessory attachment bar. For example, the user may grasp a lower portion of the accessory 4000 and push the lower portion forward while imparting an upward force against the lower portion. These actions will cause the accessory attachment element, described below, to release the accessory from the accessory attachment bar 3000. Once the accessory 4000 is detached from the accessory attachment bar 3000, the user 50 can, if desired, place the accessory 4000 in the stow pouch 5100, as illustrated in FIG. 12.

In more detail, with reference to FIG. 12, the user can later remove the accessory 4000 from the stow pouch 5100 and reattach it to the accessory attachment bar 3000. If the user left the connector arm assembly 1000 in a locked configuration after detaching and stowing the accessory 4000, the accessory will be in the same position and orientation relative to the helmet 5000 upon reattachment that the accessory was in prior to the detachment. Generally, once the user establishes an operating position of the accessory 4000, if the connector arm assembly 1000 remains in the locked configuration, the accessory, when reattached to the accessory attachment bar 3000, will be returned to the previously selected operating position. If the user wishes to readjust the operating position of the accessory 4000, the user can slightly loosen the lock actuator 1100 to slightly unlock the connector arm assembly 1000.

As noted above, when the connector arm assembly 1000 is slightly unlocked, elements are still frictionally seated, e.g. against the upper and lower collar retaining clips 1252, 1352, the upper and lower ball retaining clips 1254, 1354, and the friction gasket 1440. Thus, the slightly unlocked state prevents the connector arm from movement but allows the user to overcome the frictionally seated force to adjust the operating position of the accessory 4000. In an operating example, a user can slightly unlock the accessory attachment bar 3000 by slightly loosening the lock actuator 1100 with one hand while making very fine adjustments to the position of the accessory 4000 with the other hand and then retighten the lock actuator 1100.

Figure 13B:
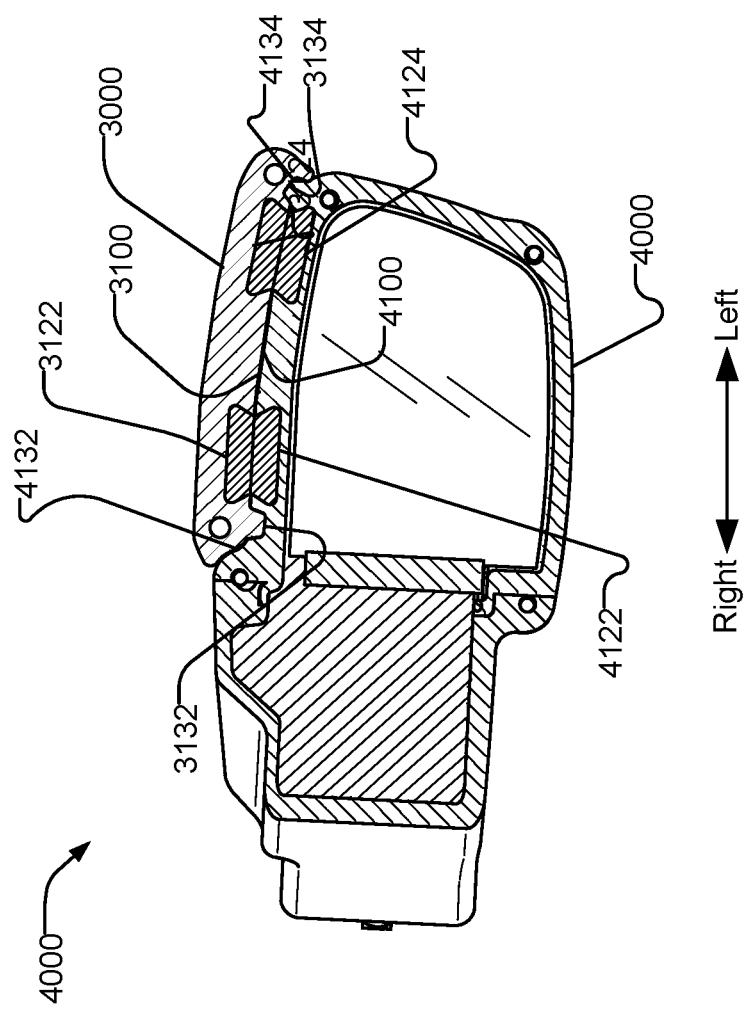
FIG. 13B is a cutaway view of the HUD device accessory and accessory attachment bar in FIG. 14A, where the figure illustrates magnetic coupling between the HUD device accessory and the accessory attachment bar as an attachment means.
Figure 13A:
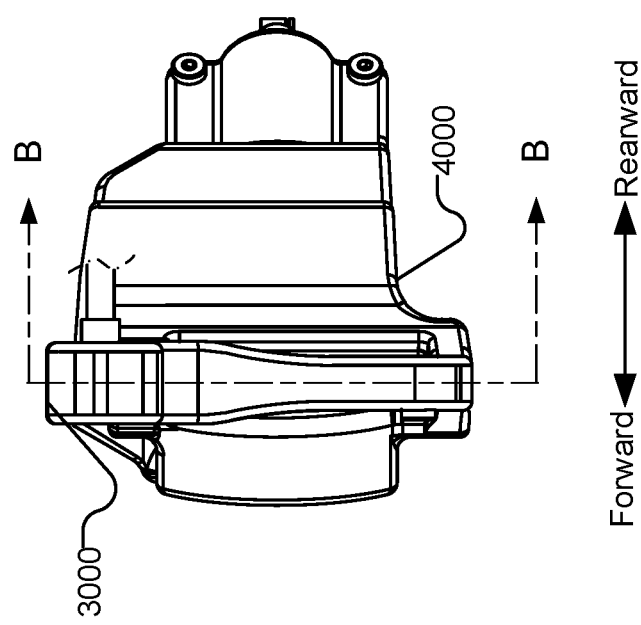
FIG. 13A is a side view of a HUD device accessory attached to an accessory attachment bar.

FIGS. 13A and 13B show more detail for the HUD device accessory 4000 shown in FIGS. 10, 11 and 12.

FIG. 13A shows a side view of the HUD device accessory 4000. The accessory 4000 is coupled to an accessory attachment bar 3000. Line B-B indicates a cross section of the accessory 4000. The cross section defines a vertical plane through the accessory 4000 that runs substantially parallel to a front face of the accessory.

FIG. 14B is a cutaway view of the accessory 4000 along a plane of the line B-B in FIG. 13A. In the illustrated example, the accessory 4000 is held in place on the accessory attachment bar 3000 by one or more pairs of opposing coupling magnets as an attachment means.

For example, the accessory 4000 includes a first accessory magnet 4122 and a second accessory magnet 4124, and the accessory attachment bar 3000 includes a first attachment bar magnet 3122 and a second attachment bar magnet 3124. The accessory magnets 4122, 4124 are fastened to a top surface 4100 of the accessory 4000 and the attachment bar magnets 3122, 3124 are fastened to a bottom surface 4100 of the accessory attachment bar 3000.

The magnets are permanent magnets of possibly different form factors. These form factors can include bar magnets with north and south poles located on opposite ends of the bar, or substantially flat magnets with the north and south poles located on the opposing flat surfaces, in examples.

The accessory magnets 4122, 4124 and the attachment bar magnets 3122, 3124 are disposed such that when the accessory 4000 is attached to the accessory attachment bar, the first accessory magnet 4122 is aligned with and opposed to the first attachment bar magnet 3122 and the second accessory magnet 4124 is aligned with and opposed to the second attachment bar magnet 3124. In this way, the first accessory magnet 4122 and the first attachment bar magnet 3122 form a first pair of coupling magnets, and the second accessory magnet 4124 and the second attachment bar magnet 3122 form a second pair of coupling magnets. Additional magnet pairs are usable to increase magnetic forces as required to securely fasten the accessory to the accessory attachment bar.

In some embodiments, the magnets are arranged such that the poles of the accessory magnets are oriented differently with respect to one another on the top surface 4100 of the accessory 4000, and the poles of the attachment bar magnets are oriented differently with respect to one another on the bottom surface 3100 of the accessory attachment bar 3000. When the magnets are flat magnets, for example, the north pole of the first accessory magnet 4122 might face outward (i.e. its south pole is disposed against the top surface 4100) while the south pole of the second accessory magnet 4124 might face outward (i.e. its north pole is disposed against the top surface 4100). Correspondingly, the south pole of the first attachment bar magnet 3122 would face outward while the north pole of the second attachment bar magnet 3124 would face outward.

In this manner, the arrangement of the poles of the magnets helps to correctly align and position the accessory 4000 relative to accessory attachment bar 3000. In a preferred embodiment, the coupling magnets are selected to provide self-alignment between the accessory 4000 and the attachment bar 3000. In an example, when the user is holding the accessory in one hand the user can position the accessory top surface 4100 proximate to the attachment bar bottom surface 3100 and from there, the magnetic attraction forces provided by each coupling magnet guide the accessory top surface 4100 from the hand of the user to the attachment bar bottom surface 3100 and further guide the accessory into a mounted position defined by the coupling magnets and other alignment features described below.

In another embodiment, only one of the accessories 4000 or the accessory attachment bar 3000 includes magnets. Here, the object not including the magnets would typically include a ferromagnetic metal element attached thereto instead of a magnet. Ferromagnetic metals at least include iron, nickel, cobalt, gadolinium, dysprosium, and alloys that include ferromagnetic metals, e.g. steel. In a non-limiting example, the accessory 4000 does not include a coupling magnet but instead includes a stainless steel strip or bar opposed to magnets 4122, 4124 e.g. between surfaces 3100 or 4100 for coupling the stainless steel strip to the magnets 4122 and 4124. Alternately the stainless steel strip or bar can be mounted onto the accessory opposed to the magnets 3122, 3124.

In some embodiments, the accessory 4000 and accessory attachment bar 3000 are each formed with one or more alignment features. The accessory attachment bar 3000 includes first and second attachment bar alignment features 3132, 3134 formed by surface 3100 of the accessory attachment bar 3000 and the accessory 4000 includes first and second accessory alignment features 4132, 4134 formed by surface 4100 of the accessory 4000.

Preferably, the alignment features include bosses on one surface 3100, 4100 and corresponding receptacles on the other surface 3100, 4100 that require mutual alignment for the bosses to engage with the receptacles. Examples of bosses include pins, pegs, or other extending or protruding features. Examples of receptacles include indentations, pockets, cavities and holes, or other objects or spaces formed to mate with corresponding bosses to receive and align the bosses in mating contact or engagement with the receptacles. In one example, the interlocking pairs might include a boss with a keyed feature and a receptacle that is designed to accept the boss and its keyed feature.

The alignment features of each interlocking pair of alignment features provide mating contact between the opposing surfaces 3100 and 4100 when the accessory 4000 is mounted on the accessory attachment bar 3000. The alignment features guide the alignment of the accessory 4000 and the attachment bar 3000 with respect to one another, and interface in a manner that guides the accessory 4000 to its operating position and prevents various translations of the accessory 4000, e.g. from left, right, forward, or backward translation relative to the accessory attachment bar 3000.

Figure 14:
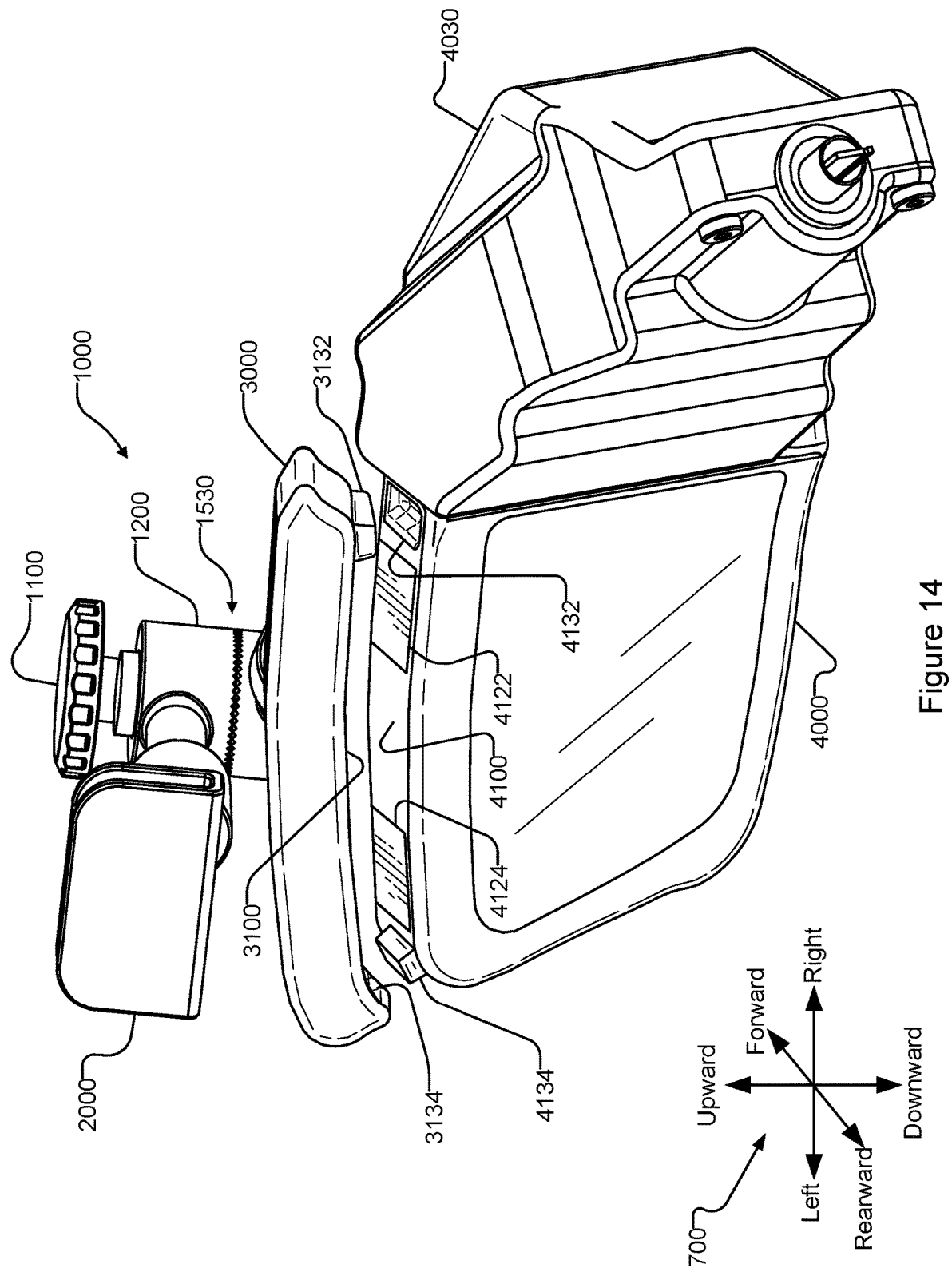
FIG. 14 is an enlarged rear exploded perspective view of the HUD device and accessory attachment bar in FIG. 14A, where the figure shows more detail for the magnetic coupling and also shows alignment features between these components.

FIG. 14 shows more detail for the interlocking pairs of alignment features between the accessory 4000 and the accessory attachment bar 3000. A first interlocking pair includes alignment features 3132 and 4132, and a second interlocking pair includes alignment features 3134 and 4134.

In the illustrated example, the first attachment bar alignment feature 3132 is formed as a rectangular boss that extends outward from the bottom face 4100 of the accessory attachment bar 4000. Correspondingly, the first accessory alignment feature 4132 is an indented rectangular cavity on the top face 4100 of the accessory 4000 that receives the first attachment bar alignment feature 3132. Also, the second attachment bar alignment feature 3134 is an indented rectangular cavity on the bottom face 3100 of the attachment bar 3000.

Correspondingly, the second accessory alignment feature 4134 is formed as a rectangular boss that extends outward from the top face 4100 of the accessory 4000. In this example at least one mating pair of alignment features, e.g. the boss 3132 and the receptacle 4132 are formed to mate with each other with substantially zero play or translation in one axis e.g. front to back, thereby uniquely establishing a front to back position of the accessory with respect to the accessory attachment bar while the opposing mating pair of alignment features, e.g. the boss 3134 and the receptacle 4134 are formed to mate with each other with substantially zero play or translation in another axis e.g. left to right, thereby uniquely establishing a left to right position of the accessory with respect to the accessory attachment bar.

In another example, the second accessory alignment feature 4134 and the second attachment bar alignment feature 3134 are formed as mating sloped surfaces. This can be useful in guiding the alignment of the accessory 4000 relative to the accessory attachment bar 3000 and can prevent the accessory from sliding to the left relative to the accessory attachment bar.

Although the first and second attachment bar alignment features 3132, 3134 are shown as rectangular bosses and rectangular cavities or tapered rectangular bosses and rectangular cavities, other shapes of alignment features can be used without deviating from the concepts disclosed herein. In examples, the first and second attachment bar alignment features can be configured with prismatic cylinders having more than four sides, square cross sections, quadrille shaped cross sections other than rectangles, triangular shaped cross sections, or possibly round or oval cross sections.

Figure 15:
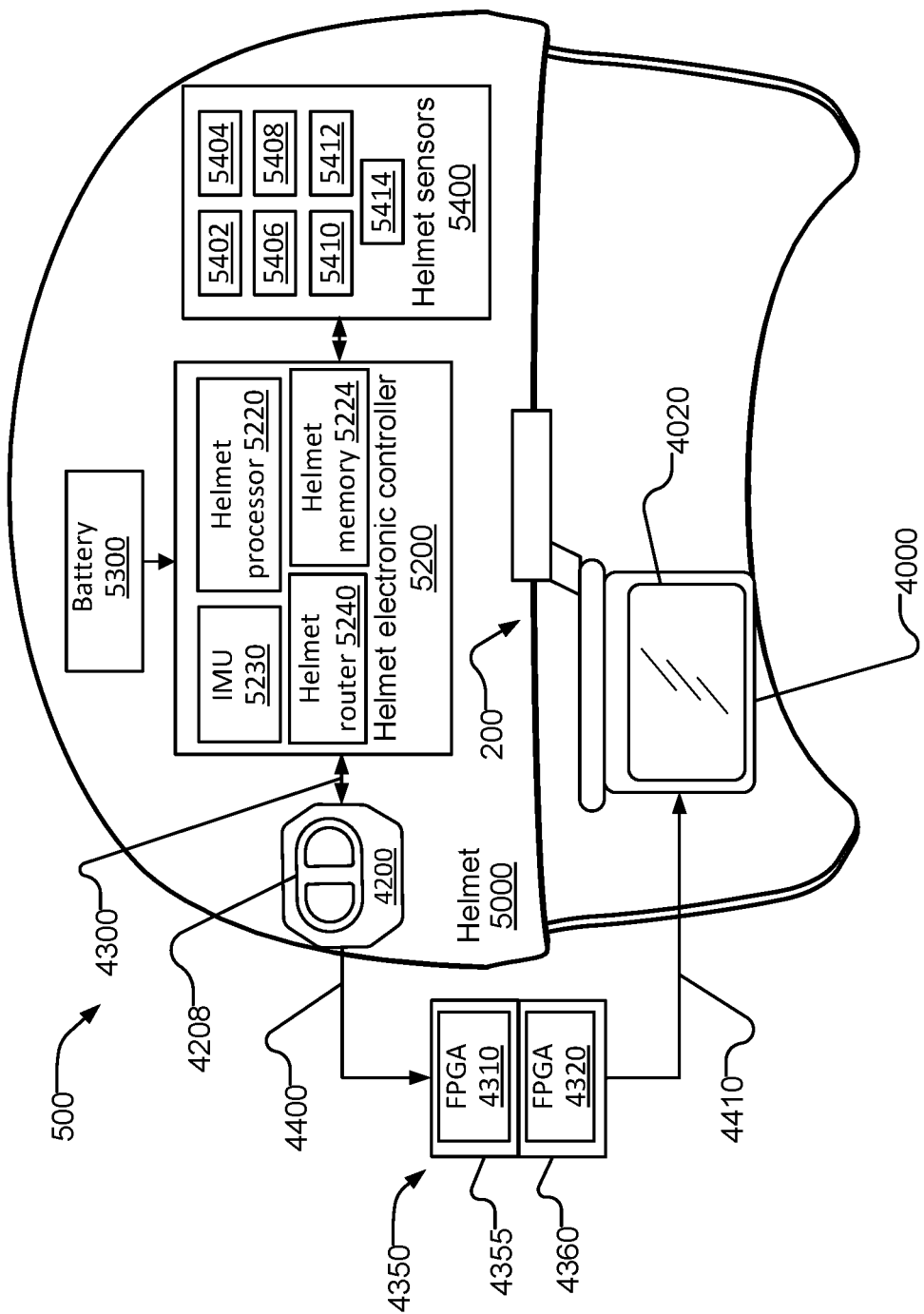
FIG. 15 is a schematic diagram of a HUD system, according to an embodiment.

FIG. 15 shows another embodiment of a HUD system 500 with a HUD device accessory 4000 connected to accessory connector 200 which is a helmet-mounted accessory connector similar to the above described accessory connector 100. The HUD system 500 includes similar components as in the HUD system shown in FIG. 10 through FIG. 12 and includes additional components. These additional components include a cable electrical connector 4350 disposed between the second HUD cable 4400 and a first end of a third HUD cable 4410.

A second end of the third HUD cable 4410 connects to the image rendering element 4030. The electrical connector 4350 includes first connector portion 4355 attached to an end of the second HUD cable 4400 and a second connector portion 4360 attached to the first end of the third HUD cable 4410. The first connector portion 4355 includes a first data processing device 4310 and the second connector portion 4360 includes a second data processing device 4320. Each data processor 4310, 4320 is housed inside the corresponding first or second connector portion.

When the connector portions 4355, 4560 are interconnected, the first and second data processing devices 4310 and 4320 are also interconnected to exchange data related to images to be displayed on the transparent display screen 4020. In an exemplary embodiment, the HUD device accessory 4000 includes an optical waveguide for displaying content viewable by the user 50 on the display screen 4020 positioned in front of the eye of the user 50.

The cable processing devices 4310, 4320 are disposed along the first or second HUD cables 4300 or 4400. In an exemplary embodiment, the first and second cable processing devices 4310, 4320 are field-programmable gate array (FPGA) devices. The battery 5300 is mounted on the helmet 5000 and is electrically connected to the helmet electronic controller 5200 to provide a source of power.

Time varying display patterns e.g., video images, text images, graphic images, in black and white or in color, are generated according to one or more computer-controlled applications stored in the helmet memory 5224 and operated on the helmet processor 5220. The helmet processor 5220 arranges video display data into individual image frames wherein each image frame has the same number of total image pixels. A plurality of image frame patterns is stored by the helmet memory 5224.

The image patterns comprise image templates wherein each image template includes information windows or fields wherein information will be displayed, e.g., a time-of-day window, a temperature window, a battery state of charge window, or the like. The image patterns include menu layouts for display on the display screen 4020. The menu templates and other templates may be mission specific, user specific, or helmet specific depending upon configuration of the helmet, the role or the user, or the mission type. Image templates can be added to the helmet memory or modified when the helmet is not in use, e.g., by connecting the helmet processor 5420 to an external computer device programed to modify or delete existing image templates and operating modes stored in the helmet memory 5224 and or to add new image templates and operating modes to the helmet memory 5224.

A simple video display data set, e.g., black and white, includes one of two brightness values for each pixel; e.g., a brightness value of one, for pixel on, or a brightness value of zero, for pixel off. More complex video display data, e.g., for grey scale imaging, comprises a brightness value range for each image pixel, e.g., the brightness range can have a plurality of different pixel brightness values ranging between pixel on and pixel off. Even more complex video display data, e.g., for color imaging, includes a plurality of different color pixels each having a brightness value or a range of brightness values ranging between pixel on and pixel off.

The total number of brightness values for an image frame corresponds with the total number of pixels in the individual image frame. To generate an image frame, the helmet processor 5220 assembles a raster image data stream of pixel brightness values with frame start and end indicators at the beginning and the end of the image data stream. The total number of pixels that can be displayed by transparent display screen 4020 is usually fixed. When the total number of pixels in the image being generated by the helmet processor 5240 exceeds the total number of pixels that the transparent display screen 4020 can display, the image data steam is modified by the first data processing device 4310 and/or the second data processing device 4320 to make the image data steam compatible with the display screen 4020. In an example, the second data processor 4320 stores characteristics of the display screen 4020. The characteristics include image resolution, total number of pixels, screen dimensions, e.g., diagonal, width and or height dimensions, frame refresh rate, operating modes, e.g., black and white, grey scale or color, pixel brightness signal value ranges, color signal value ranges, and other operating modes e.g., image rotation, a negative image mode, an image recording mode, or the like. The processing devices 4310, 4320 can also increase a signal-to-noise ratio (SNR) of image data frames and allow for slight modifications in the signal for individual HUD device accessories.

More detail for the helmet controller 5200 is also shown. The helmet controller includes a helmet processor 5220 and associated electronic helmet memory 5224. The helmet processor 5420 is in communication with a network interface device 5240 operating as a local area network access point, a network gateway, or network router. In other examples the helmet controller 5200 is interfaced with a plurality of network interface devices each configured to interface with a different computer network. The helmet processor 5240 is also in communication with a plurality of helmet-mounted sensors and transducers 5400 or transducers described below.

The network interface device 5240 of the present example embodiment is a wired Local Area Network (LAN) access device operating a Personal Area Network (PAN), which in the present example embodiment is a standalone helmet network that includes the helmet processor 5220, the helmet memory 5224, and the accessory 4000 as network endpoints. Wired LAN networks utilize network protocols based on Universal Serial Bus (USB), IEEE-1394, Thunderbolt, or the like and any of these network protocols, and others, are usable without deviating from the present disclosure. The LAN network interface device 5240 broadcasts network messages to network devices that are connected to the network interface device by a wired interface. When a connected network device acknowledges a broadcast message, the network interface device 5240 joins the connected network device to the network and assigns the connected local area network end point a local network address, e.g., based on a Media Access Control (MAC) address of the connected end points.

In the present example the first HUD cable 4300 extends between the network interface device 5240 and the HUD user interface 4200. A first end of the first HUD cable 4300 is attached to the network interface device 5240 and a second end of the first HUD cable 4300 is fixedly attached to the HUD user interface 4200. A second HUD cable 4400 extends between the HUD user interface 4200 and a third HUD cable 4410. The third HUD cable 4410 extends between the second HUD cable 4400 and the image rendering element 4030.

A first end of the second HUD cable 4400 is fixedly attached to the HUD user interface 4200 and a second end of the second HUD cable 4400 is terminated by a first connector portion 4355 and by a first cable processing device 4310 associated with the first connector portion 4355 or the second HUD cable 4400. A first end of the third HUD cable 4410 is terminated by a second connector portion 4360 and by a second cable processing device 4320 associated with the second connector portion 4360 or the third HUD cable 4410. A second end of the third HUD cable 4410 is fixedly attached to the image rendering element 4030. The first connector portion 4355 and the second connector portion 4360 are joined together to connect the second and third HUD cables 4400 and 4410. When the first connector portion 4355 and the second connector portion 4360 are joined together, the first and second cable processing devices 4310, 4320 become electrically interfaced.

When the first and second cable processing devices 4310, 4320 are initially interconnected, the display screen data stored on the second data processor 4320 is read by the first data processor 4310 and may be relayed to the helmet processor 5220. Thereafter the helmet processor 5220 and each of the first and second processing devices 4310 and 4320 exchange configuration information related to the characteristics of the accessory 4000 and each processor establishes image rendering settings suited to displaying images on the transparent display screen 4020. The HUD user interface device 4200 includes a profile selection button 4208 that can be actuated by the user to modify the image rendering settings, e.g., when the user chooses to alter an image rendering mode.

The network interface device 5240 may include other network interface devices for connecting to other network devices using other network protocols. In an example the helmet network is configured as a Wireless Local Area Network (WLAN) device operating a Personal Area Network (PAN). Such wireless WLAN networks utilize network protocols based on Wi-Fi, (IEEE 802.11) WiFi direct, Bluetooth, and others. When the network interface device 5240 is a WLAN network access point, the network interface device 5240 uses radio signals to broadcast network messages to local network devices that are connected to the network interface device by a wireless network interface device.

When the helmet network is a WLAN network, each end point of a WLAN includes a wireless network interface device compatible with the WLAN protocol of the WLAN network interface device and the WLAN network interface device uses radio signals to assign each connected wireless local area network end point a local network address, e.g., based on a Media Access Control (MAC) address of the connected end points. In the present example at least one of the first and second processing devices 4310 and 4320 includes a wireless network interface device using a network protocol that is matched to the wireless network protocol used by the WLAN network interface device 5240.

In a further example embodiment, a portion of the helmet network is a direct peer-to-peer connection between two different processors, e.g., between the helmet processor 5220 and the first and second processing devices 4310 and 4320 or between the helmet processor 5220 and the user image rendering element 4030, and/or the HUD user interface. In a further example embodiment, the helmet network may gain access to other networks by interfacing with a mobile device that includes a cellular network interface device or other radio network interface device that uses radio signals over greater distances to establish network communication sessions between the helmet network interface device 5240 and remote cellular network access points, e.g. to gain access to one or more private networks through the cellular network infrastructure. In a still further example embodiment, the helmet electronic controller 5200 includes a cellular network interface device in communication with the helmet processor 5220. In the present example, local end point data packets having destination IP addresses that are not present on the helmet network, i.e., not reachable by local LAN or WLAN, are routed to the cellular network interface device or to another network interface device that provides access to other networks, for delivery to remote destination IP or MAC addresses.

Helmet-mounted sensors and transducers 5400 are in communication with the helmet processor 5220. The helmet-mounted sensors and transducers 5400 are either directly wired to the helmet processor 5220 or they are connected by wires to the LAN network interface device 5240 or by a wireless network interface device when the helmet network includes a wireless network access point. In an exemplary embodiment, the helmet includes one or more energy detectors 5402 for detecting electromagnetic energy falling thereon. The energy detectors are in communication with the helmet processor 5220 and monitored by computer application for tracking electromagnetic energy for various reasons.

In one example, the energy detector comprises a photon detector a photodiode detector array, a camera, or the like, for sensing electromagnetic energy illuminance received by the energy detector 5402. In an example embodiment, multiple energy detectors 5402 are each configured to detect electromagnetic energy of different spectral ranges, e.g., infrared wavelengths, a portion of infrared spectrum, ultraviolet wavelengths or a portion of the ultraviolet spectrum, or the like. Other energy detector examples include a video camera or a still camera configured to capture image frames or still images over a desired spectral range, e.g., an infrared camera, a visible black and white camera or visible color camera, or the like. The helmet-mounted sensors and transducers 5400 also include an illuminator 5408 configured to illuminate a user viewing area. Illumination having a desired spectrum is emitted from the illuminator 5408 and may be directed by the user, e.g. when the user turns the head to direct the illumination. The desired spectrum may include visible wavelengths or invisible wavelengths over wavelength ranges. Preferably the illuminator 5408 is powered by the helmet battery 5300.

Helmet-mounted sensors and transducers 5400 can also include audio sensors and transducers, e.g., a user microphone 5410 for speech, helmet-mounted microphones 5412, attached to external surfaces of the helmet for detecting local audio, user speakers 5414, e.g., headphones or earcups attached to the helmet, electrochemical sensors, 5404, e.g., to detect various toxic chemicals and or gases, such as mustard gas, sarin, chlorine, hydrogen cyanide, tear gas, carbon monoxide, or the like. The other sensors and transducers can further include navigation and inertia measurement devices such as a Global Positioning System (GPS) receiver 5406 for receiving GPS signals from GPS satellites.

The GPS signals received from GPS satellites are accessed by the helmet processor 5220 and the helmet processor, using a locally stored GPS signal analyzer program. The helmet processor determines, based on the GPS signals received from GPS satellites, present global location and time of day information. The other sensors and transducers can further include an Inertia Measurement Unit (IMU) 5230 mounted to the helmet. The IMU 5230 includes one or more accelerometers for measuring linear acceleration, e.g., along three linear axes. The IMU 5230 may include one or more gyroscopes for measuring instantaneous angular or attitude positioning of the helmet and the IMU 5230 may include a magnetometer or electronic compass for providing a heading or compass reference. The IMU 5230 provides information that allows the helmet processor 5220 to determine the orientation of the head of the user at any instant in time, e.g., looking left, looking right, up down or combinations. Additionally, the GPS receiver 5406 and the IMU 5230, in combination with the helmet processor 5240, can provide other information about the user, e.g., whether the user is stationary or moving, the direction and velocity of the user movement, orientation of the user e.g., lying down or standing, or the like.

The other sensors and transducers can further include a temperature sensor in communication with the helmet processor 5220 to provide instantaneous temperature measurement data and process the received temperature data to generate text-based temperature data. The processor can then format the text-based data, as specified by a user-selected HUD display profile, with a particular font and/or font size and with a particular unit of temperature and provide the formatted text-based temperature data to the display screen 4020 for display thereon.

Exemplary Soldier-Portable Network Systems

Figure 16:
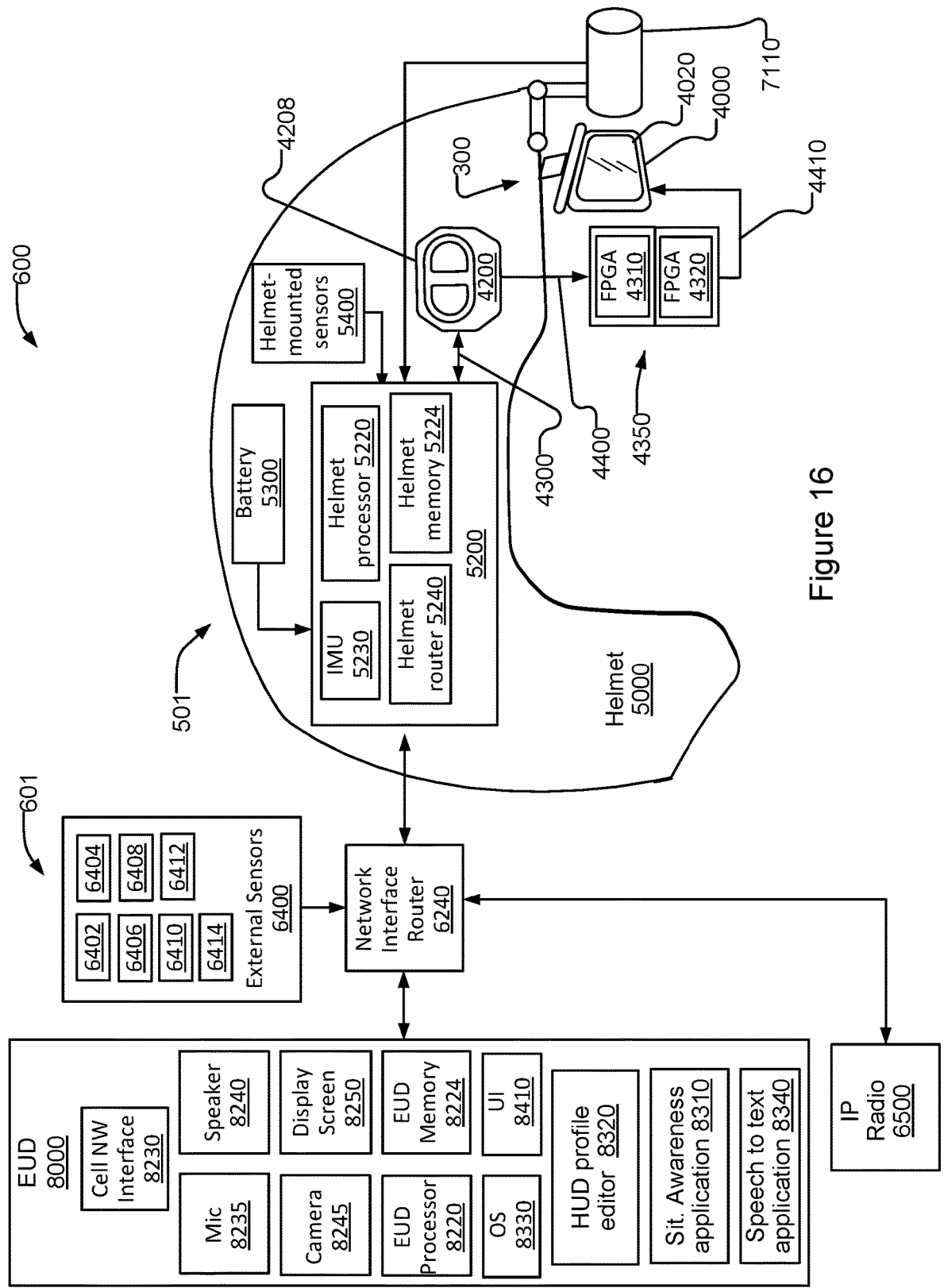
FIG. 16 is a schematic diagram of a soldier-portable network system, according to an embodiment, where the soldier-portable network system includes another embodiment of a HUD system.

Soldier Portable Network System Including Exemplary HUD System with Night Vision Sensor and HUD Device Accessories FIG. 16 shows a soldier-portable network system 600. The soldier-portable network system that includes a helmet network system 501, and a body network system 601.

The helmet network system 501 includes substantially similar components as the HUD system 500 shown in FIG. 15. There are differences, however. The helmet network system 501 includes a different embodiment of an accessory connector 300 that can carry the HUD device accessory 4000 and night vision sensors 7110. The helmet network system 501 also includes helmet-mounted sensors and transducers 5400 described above.

The components of the body network system 601 are arranged as follows. A body network interface device or router 6240 is external to the helmet network 501 and provides a LAN or WLAN network access point for establishing a network interface between the body network 601 and the helmet network 501. The body network 601 includes an End User Device (EUD) 8000 which is preferably a mobile computing device, a radio 6500 such as an Internet Protocol (IP) radio, and a plurality of external or body sensors or transducers 6400 that are either worn by the user or carried by the user.

In an example embodiment, the night vision sensor 7110 and the HUD device accessory 4000 are carried by a common accessory attachment bar (not shown) of the accessory connector 300. Alternately the night vision sensor 7110 and HUD device accessory 4000 can be swapped when one or the other is mounted to the accessory connector 300. As illustrated, at least one night vision sensor 7110 is mounted to the helmet 5000 via an accessory connector 300. The accessory connector 300 is attached to the helmet 5000 by a helmet accessory connector, e.g. similar to the above described accessory connector 100 described above or similar to a known night vision helmet support mechanism. The helmet accessory connector 300 is configured to support the night vision sensor 7110 in an operating position in front of one eye of the user and may be configured to stow the night vision sensor 7110 in another non-operating position wherein the night vision sensor 7110 remains attached to the helmet 5000 without obstructing the user's vision. In some applications, the operating position of the night vision sensor 7110 is positioned in front of the visual display 4020 of the HUD device accessory 4000.

In operation, a user's gaze passes through just the night vision sensor 7110 or through both the visual display 4020 and the night vision sensor 7110. In this way, the user 50 can view information provided by the helmet processor 5220 for display on the visual display 4020 of the HUD device accessory 4000, and also view enhanced imaging information provided by the night vision sensor 7110.

The body sensors or transducers 6400 can include, for example, biometric sensors 6402 for measuring user pulse, user temperature, user respiration, user blood pressure or other medical sensor implementations. Other body mounted sensors or transducers 6400 include electrochemical sensors 6404 for identifying toxins, body cameras 6406, user worn audio microphones 6408, electromagnetic energy detecting sensors 6410, or the like.

The helmet data processor 5220 is additionally operable to receive measurement data from the helmet-mounted sensors 5400. In an exemplary embodiment, the helmet processor 5220 can receive audio data from one or more helmet-mounted microphone sensors 5412 and process the audio data to generate HUD display data corresponding to the audio data. In one example, the display data includes an alert notification with a visual indicator of a direction from which a detected sound was received from a helmet-mounted microphone 5412. The processor 5220 then provides the formatted HUD display data to the HUD device 4000 for display on its viewing screen 4020.

The body network interface device or router 6240 is a WLAN or LAN network access device configured to establish a WLAN or WAN, to assign local network addresses to end points and to broadcast network messages to all connected network devices or to directly route network messages only to a specific network device interfaced therewith. In some embodiments, the network router 6240 is configured as a standard USB router but may comprise any device suitable for routing data signals between connected devices. The network router 6240 communicates with the helmet electronic controller 5200, the EUD 8000, the IP radio 6500 and the external sensors 6400 via one or more communications links. These links could be wired or wireless links. The wireless links can include cellular links or WiFi links, for example. The USB router is operable to share a broadband internet connection among all the network devices that are interfaced with the USB router 6240.

In some exemplary embodiments, the network interface device or router 6240 is communicatively coupled to the helmet electronic controller 5200 via a wired communication link, for example via one or more USB cables. In other exemplary configurations, the communication link is a wireless communication link, for example Bluetooth, UWB, WiFi, ZigBee, or the like, in which case the network interface device or router 6240 performs data routing.

The network router 6240 might also operate in a primary/secondary arrangement with respect to processing or handling of specific data. In a particular embodiment, the helmet processor 5220 operates as a secondary USB device that requests information from the body network interface device or router 6240 as a primary USB device. Here, the helmet processor 5220 might request one or more HUD display profiles from the body network router 6240 or from an internet source. In this example, the primary USB-related process executing on the body network router 6240 controls routing by forwarding data packets to the helmet network interface or router 5420 which reviews the data packets and forwards the data packets to endpoints on the helmet 5000 that the data packets are addressed to.

The IP radio 6500 is configured to send and receive audio signals and IP data represented by audio signals over one or more radio frequency RF communication links. The body network router 6420 routes audio and IP data between the IP radio and EUD 8000 and, in some embodiments, between the IP radio and the helmet network interface device or router 5240. In an example operating mode, the IP radio establishes one or more communication sessions with external IP assets e.g. with a private network, with another user that is equipped with a similar body network and or helmet network, with a mission command center computer device, or the like. Once established, each of the EUD 8000, the body network router 6420 or the helmet router 5240 are potentially able to utilize the one or more communication sessions established by the IP radio 6500 to download data to and or upload data from the external IP assets or to communicate with others using audio, video, and text messaging with some or all of the messaging being displayed on the HUD accessory 4000, on a video display of the EUD 8000 and any audio messaging conducted over a user microphone and user speakers interfaced with the helmet network access device or router 5240 or over microphone and speaker resources provided by the EUD 8000.

The EUD 8000 includes an EUD processor 8220 and associated EUD memory 8224, a cellular network interface device 8230, a user microphone 8235, a user speaker 8240, a camera 8245, a display screen 8250, or the like. The EUD 8000 further includes an operating system OS 8330 operating on the EUD processor. In some exemplary embodiments, the OS is an Android OS. The EUD also includes a user interface UI 8410, a HUD profile editor application 8320, a situational awareness application 8310, and a speech-to-text application 8340. The UI 8410 includes, for example, one or more of a touch screen for command inputs, one or more user interface buttons for command inputs, an audio input device i.e. the microphone 8235 for command inputs and communication, or the like. In some environments, the EUD can establish network messaging sessions with external IP assets which can be shared with other devices e.g., over the body network interface device 6240 and or the helmet network interface device 5240.

The HUD device profile editor 8320 is an application running on the EUD processor 8220. The user 50 can control the HUD device profile editor 8320, for example using the UI 8410, to generate or modify one or more HUD display profiles. One or more HUD display profiles can also, or alternatively, be downloaded from external IP assets. The HUD device can directly access external IP assets independently of the IP radio.

Various applications can run on the processor 8220 of the EUD 8000. These applications can receive various forms of IP data, perform operations on the data, and forward the data to the HUD system 501 via the body network interface device or router 6240 and helmet network interface device or router 5240. In an exemplary embodiment, the EUD 8000 includes a situational awareness application 8310, for example an Android Tactical Awareness Kit (ATAK) application. The situational awareness application 8310 receives IP data from IP radio 6500, via the body network router 6240, and processes the received IP data to generate situational awareness information. The situational awareness data can include, for example, location of friendly and/or enemy forces, one or more maps and geographic locations, text-based information received from another user or from a headquarters, and data or image feeds from one or more external systems e.g., imaging information from an aerial drone. The IP radio 6500 communicates the situational awareness data to the EUD 8000 or to the helmet network, or both, via the body network interface device or router 6240 and or the helmet network interface device or router 5240.

The speech-to-text application 8340 is operable to receive audio data, for example, IP audio data or digitized RF audio data received from the IP radio 6500. The speech-to-text application 8340 processes the audio data to generate speech-to-text data based on the audio data. The EUD 8000 can then communicate speech-to-text data to the helmet network interface device or router 5240 for display by the HUD accessory 4000.

The external sensors 6400 can include, for example, biometric sensors 6402, e.g. heart rate, blood pressure, user body temperature, temperature sensors for measuring external temperature 6412, and positioning sensors, e.g., a GPS receiver unit 6414 that senses GPS signals and determines a geographic location based on the sensed signals. The external sensors 6400 collect sensor input data, process the sensor input data and generate sensor output data Additionally, EUD 8000 may include various external sensors or transducers, e.g. a microphone, the camera, a display screen that are utilized by one or more computer based applications operating on the EUD.

The EUD processor 8220 and/or the helmet processor 5220 can receive output data from the external sensors 6400 including one or more of situational awareness data, biometric data, image data, audio data, electromagnetic energy data, electrochemical data and speech-to-text data from their respective applications 8310, 8340. For this purpose, the helmet data processor 5240 typically consults a currently active HUD display profile and determines, based on the HUD display profile which if any of the externally generated data should be selected for display on the HUD accessory device 4000.

In some exemplary embodiments, the helmet processor 5220 communicates data to the EUD 8000 and/or the IP radio 6500 via the helmet network interface device 5240 and the body network interface device or router 6240. For this purpose, the data may include type information and destination and source information, e.g., MAC ID's so that the various components can identify/characterize the data and route it to a particular component in response. The data can include input data from one or more of the IMU 5230, the helmet-mounted sensors 5300, the night vision sensor 7110, external microphone, electrochemical sensors, electromagnetic energy sensors, cameras, user microphone, or the like. The data might also include data generated by the helmet processor 5220 based on the input data, for example, HUD display data formatted for display on a viewing display screen of the UI 8410 of the EUD 8000.

In some embodiments, the helmet processor 5220 can direct processing of data to the EUD processor 8220. In one example, the helmet processor 5220 might receive night vision sensor data from the night vision sensors 7110 but defer processing of the night vision data to the EUD processor 8220. The EUD digital data processor 8220 can then process this night vision data, and then forward the processed night vision data to the helmet processor 5220 for further processing and/or analysis or forward the processed night vision data to a remote network device for storage or further processing. The helmet processor 5220 can also direct the processed night vision data to the HUD accessory 4000 for display on the transparent screen 4020.

Soldier Portable Network System Including Exemplary HUD System with Binocular Sensors and Accessories FIG. 17 shows a soldier-portable network system 602. The soldier-portable network system 602 includes substantially similar components and is arranged in a similar fashion as the soldier-portable network system 600 of FIG. 16. However, there are differences.

The soldier-portable network system 602 includes a HUD system 502. The HUD system 502 includes similar components and is arranged in a similar fashion as the HUD system 501 in FIG. 16. However, the HUD system 502 includes multiple accessory connectors 201, 202 that each carry a HUD device accessory 4001 and 4002, respectively. Each is positioned in front of a different eye of the user 50.

The accessory connectors 201, 202 also each carry one or more night vision sensors. In the illustrated example, the accessory connector 201 carries night vision sensor 7210 while the accessory connector 202 carries night vision sensor 7220. In an alternative arrangement, one or both night vision sensors are replaced with a different sensor, for example another image enhancing device, e.g., a telephoto or wide field lens, or the like. Because the HUD system 502 has two accessories that are positioned in front of a different eye of the user 50, this HUD system 502 is also known as a binocular HUD system.

Each accessory in the HUD system 502 is also accompanied by its own HUD device profile sending unit, set of HUD cables, and cable processing devices described above. In more detail, the accessory 4001 is accompanied by HUD device profile sending unit 4201, set of first, second, and third HUD cables 4301, 4401, 4411, and cable processing devices 4311 and 4321. In a similar vein, the accessory 4002 is accompanied by HUD device profile sending unit 4202, set of first, second, and third HUD cables 4302, 4402, and 4412, and cable processing devices 4312 and 4322.

The user 50 can operate the profile selection buttons 4208 of the HUD device profile sending units 4201, 4202 to separately select a same or different HUD display profile for the HUD device accessories 4001, 4002.

The helmet processor 5220 is operable to generate formatted HUD display data for each of the HUD device accessories 4001, 4002 and to provide the HUD display data to each accessory for display on a display screen 4020 thereof. The helmet processor 5220 is operable to generate different display data for each of the HUD device accessories 4001, 4002. For example, the helmet processor can generate display data including IMU ambient condition data for display on the first HUD device accessory 4001 and display data including user condition data (e.g., pulse, respiration, user temperature for display on the second HUD device accessory 4002. The helmet processor 5220 is further operable to receive data from both night vision sensors 7210, 7220, e.g., to record a video or snap shot images and to process and format the received night vision sensor data. For example, the helmet processor 5220 can provide formatted night vision data received from night vision sensor 7210 to HUD device accessory 4001 and formatted night vision data from night vision sensor 7220 to HUD device accessory 4002.

It will also be recognized by those skilled in the art that, while a number of embodiments have been described above, it is not limited thereto. Various features and aspects of the above described embodiments may be used individually or jointly. Further, although embodiments have been described in the context of its implementation in a particular environment, and for particular applications (e.g., for attaching an accessory to a helmet, those skilled in the art will recognize that its usefulness is not limited thereto and that the present invention can be beneficially utilized in any number of environments and implementations where it is desirable to attach an accessory to a helmet, a hat, glasses, a head band, or other head worn device or apparatus and to positing the accessory relative to a location or feature of a user. Accordingly, the claims set forth below should be construed in view of the full breadth and spirit of the invention as disclosed herein.

What is claimed is:

1. An accessory connector, the accessory connector comprising:
   a connector arm assembly including an upper body portion and a lower body portion, wherein each of the upper body portion and the lower body portion includes:
      a base and an arm extension that extends from each base, wherein the upper and lower body portions are rotatably joined at respective bases and are aligned relative to a base alignment axis that passes through a center of each of the bases, and wherein the base of the upper body portion rests atop of the base of the lower body portion;
      a ball joint rotatably attached to a distal end of each of the arm extensions; and
      an end rod extending from each of the ball joints; and
   a helmet attachment clip connected to a distal end of the end rod of the upper body portion.

2. The accessory connector of claim 1, further comprising an accessory attachment bar for attaching an accessory to the accessory connector, wherein the accessory attachment bar is fixedly attached to a distal end of the end rod of the lower body portion.

3. The accessory connector of claim 2, wherein the accessory connector allows one handed adjustment of a position and orientation of the accessory attachment bar by a user to position and orient the accessory.

4. The accessory connector of claim 2, wherein the accessory connector allows one handed locking and unlocking of the accessory connector by a user to thereby fix a position and orientation of the accessory.

5. The accessory connector of claim 2, wherein the accessory attachment bar permits removable attachment of the accessory.

6. The accessory connector of claim 2, wherein the accessory is a heads-up display (HUD) device.

7. The accessory connector of claim 6, wherein the accessory connector enables adjustment of the HUD device by a user to place a display screen of the HUD device accessory in a desired operating position relative to an eye of the user, such that image frames displayed on the display screen are discernable by the user.

8. The accessory connector of claim 2, wherein the accessory attachment bar includes one or more first magnets coupled thereto and the accessory includes one or more second magnets coupled thereto, and wherein the accessory is coupled to the accessory attachment bar via magnetic coupling between the one or more first magnets and the one or more second magnets.

9. The accessory connector of claim 2, wherein the accessory attachment bar includes one or more first alignment features and the accessory includes one or more second alignment features, and wherein the one or more first and second alignment features are configured to repeatedly couple the accessory with the accessory attachment bar in the same spatial orientation.

10. The accessory connector of claim 1, wherein the helmet attachment clip fixedly attaches the accessory connector to a helmet worn by a user.

11. The accessory connector of claim 1, wherein the arm extensions of the upper and lower body portions each extend from respective bases along arm extension axes that are each substantially perpendicular to the base alignment axis.

12. The accessory connector of claim 11, wherein the ball joint of the upper body portion and the ball joint of the lower body portion each are rotatably attached to distal ends of respective arm extensions to provide 360 degrees of rotation of the ball joints about the arm extension axes.

13. The accessory connector of claim 1, wherein the ball joint of the upper body portion and the ball joint of the lower body portion each include a collar, formed by an annular wall enclosing a ball chamber and forming a proximal aperture and a distal aperture, and a ball supported inside the ball chamber, wherein the distal end of the end rod is fixedly attached to the ball with the end rod distal end extending from the distal aperture, and wherein the collar, the ball and the end rod of each of the ball joints are rotatable about the arm extension axis.

14. The accessory connector of claim 13, wherein the ball joint of the upper body portion and the ball joint of the lower body portion each include a first collar retaining clip engaged with a distal end of each arm extension and a second collar retaining clip engaged with an inside surface of a distal end of each ball chamber annular wall, and wherein the first collar retaining clip of each ball joint prevents each collar from separating from the distal end of each upper arm extension and the second collar retaining clip of each ball joint prevents each ball from exiting from the ball chamber through the distal aperture.

15. The accessory connector of claim 13, wherein each of the collars is formed with a collar cutout penetrating the annular wall and the distal aperture for receiving a perimeter of the end rod therein, when the ball and end rod are rotated with respect to the collar to engage the perimeter of the end rod at least partially within the cutout.

16. The accessory connector of claim 1, wherein the accessory connector arm assembly includes a locking mechanism for placing the connector in a locking configuration that:
 locks the bases to prevent rotation of the upper and lower body portions relative to one another around the base alignment axis;
 locks the upper body portion to fix rotations of the upper ball joint with respect to arm extension and to fix rotations of end rod with respect to upper ball joint; and
 locks the lower body portion to fix rotations of lower ball joint with respect to arm extension and to fix rotations of end rod with respect to lower ball joint.

17. The accessory connector of claim 16, wherein the locking mechanism includes a hinge joint disposed between the bases that includes a locking interface, and wherein the locking interface prevents rotation of the bases relative to one other around the base alignment axis when the accessory connector is in the locking configuration.

18. The connector of claim 17, wherein the locking interface is a friction gasket.

19. The connector of claim 17, wherein the locking interface comprises:
upper locking teeth disposed on a lower face of the base of the upper body portion; and
lower locking teeth disposed on an upper face of the base of the lower body portion that engage with the upper locking teeth.

20. A connector arm assembly comprising:
 an upper body portion including:
  an upper base extending along a base axis and an upper arm extension that extends from the upper base along an upper arm extension axis; and
  an upper ball joint connected to a distal end of the upper arm extension comprising:
   an upper end rod and an upper ball connected to the upper end rod,
   wherein the upper ball is rotatably seated within an upper collar, wherein the upper collar includes an annular wall, an enclosing upper ball chamber, a proximal aperture and a distal aperture, wherein the upper end rod extends from the upper collar through the distal aperture, and
   wherein each of the upper collar, the upper ball and the upper end rod rotates about the upper arm extension axis relative to the upper arm extension; and
 a lower body portion including a lower base extending along the base axis and a lower arm extension that extends from the lower base along a lower arm extension axis, wherein the upper base and the lower base are independently rotatable about the base axis.

21. The connector arm assembly of claim 20, wherein each of the upper arm extension axis and the lower arm extension axis is substantially perpendicular with the base axis.

22. The connector arm assembly of claim 20, wherein the upper collar includes a collar cutout penetrating the annular wall and the distal aperture for receiving a perimeter of the end rod therein, when the ball and the end rod are rotated with respect to the collar to engage the perimeter of the end rod at least partially within the cutout.

23. The connector arm assembly of claim 20, wherein when the connector arm assembly is in an unlocked configuration, the upper ball can be frictionally seated within the upper collar to enable persistent positioning of the upper end rod after movement of the upper end rod.

24. The connector arm assembly of claim 20, wherein each of the upper collar, the upper ball and the upper end rod rotates 360 degrees around the upper end rod axis relative to the upper arm extension.

25. The connector arm assembly of claim 20, wherein a distal end of the upper end rod connects to a helmet attachment clip that enables attachment of the connector arm assembly to a helmet worn by a user.

26. The connector arm assembly of claim 20, further comprising:
a lower ball joint connected to a distal end of the lower arm extension, wherein the lower ball joint includes:
a lower end rod; and a lower ball connected to the lower end rod, wherein a lower collar includes an annular wall enclosing a lower ball chamber and a proximal aperture and a distal aperture formed by the annual wall, wherein the lower ball is seated within the lower ball chamber and the lower end rod extends from the lower collar through the distal aperture, and wherein each of the lower collar, the lower ball and the lower end rod rotates with respect to the lower arm extension with rotation about the lower arm extension axis.

27. The connector arm assembly of claim 26, further comprising a threaded rod disposed within an upper cavity formed by the upper base and within a lower cavity formed by the lower base, and a locking actuator that engages with the threaded rod,
wherein the locking actuator rotates the threaded rod in a locking direction to transition the connector arm assembly to a locking configuration that prevents movement of the upper base with respect to the lower base, and locks the upper ball joint and the lower ball joint in fixed positions and degrees of rotation.

28. The connector arm assembly of claim 27, further comprising:
an upper lock wedge disposed within an upper cavity of the upper base and a lower lock wedge disposed within a lower cavity of the lower base that both engage with the threaded rod, wherein rotation of the locking actuator in the locking direction correspondingly rotates the threaded rod and transfers the rotation into an upward vertical translation of the lower lock wedge towards the upper lock wedge and a downward vertical translation of the upper lock wedge towards the lower lock wedge along the base alignment axis;
an upper lock rod horizontally disposed within a cavity of the upper arm extension and located between a lock rod face of the upper lock wedge and the upper ball of the upper end rod; and
a lower lock rod horizontally disposed within a cavity of the lower arm extension and located between a lock rod face of the lower lock wedge and the lower ball of the lower end rod.

29. The connector arm assembly of claim 28, wherein the upper and lower lock wedges respectively operate as upper and lower cams that convert the vertical translations of the upper and lower lock wedges at upper and lower lock rod faces into corresponding horizontal axial translations of the upper and lower lock rods.

30. The connector arm assembly of claim 29, wherein the upper and lower lock rods respectively operate as upper and lower cam arms that impinge upon the upper ball of the upper end rod and the lower ball of the lower end rod in response to the horizontal axial translations, the result of which locks the rotations of the upper and lower ball joints relative to the upper and lower arm extension axes and locks the positions and degrees of rotation of the upper and lower end rods with respect to the upper and lower ball joints.

31. The connector arm assembly of claim 26, wherein the connector arm assembly is attached to a front portion of a helmet worn by a user, and wherein the user can manipulate the locking actuator using one hand to transition the connector arm assembly into the locked configuration and to transition the connector arm assembly into an unlocked configuration.

32. The connector arm assembly of claim 26, wherein the lower collar includes a collar cutout penetrating the annular wall and the distal aperture for receiving a perimeter of the lower end rod therein, when the lower ball and the lower end rod are rotated with respect to the lower collar to engage the perimeter of the lower end rod at least partially within the cutout.

33. The connector arm assembly of claim 26, wherein each of the lower collar, the lower ball and the lower end rod rotates with respect to the lower arm extension with a range of motion that is 360 degrees around the lower arm extension axis.

34. The connector arm assembly of claim 26, wherein when the connector arm assembly is in an unlocked configuration, the lower ball can be frictionally seated within the lower collar to enable persistent positioning of the lower end rod after movement of the lower end rod.

35. The connector arm assembly of claim 26, wherein a distal end of the lower end rod connects to an accessory attachment bar.

* * * * *